US011062255B2

(12) United States Patent
Moakley

(10) Patent No.: US 11,062,255 B2
(45) Date of Patent: Jul. 13, 2021

(54) TECHNOLOGIES FOR MANAGING THE SECURITY AND CUSTODY OF ASSETS IN TRANSIT

(71) Applicant: Intel Corporation, Santa Clara, CA (US)

(72) Inventor: George P. Moakley, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 15/190,443

(22) Filed: Jun. 23, 2016

(65) Prior Publication Data

US 2016/0379165 A1    Dec. 29, 2016

Related U.S. Application Data

(63) Continuation-in-part of application No. 14/748,604, filed on Jun. 24, 2015, now abandoned.

(51) Int. Cl.
| | |
|---|---|
| *G06Q 10/08* | (2012.01) |
| *H04W 4/029* | (2018.01) |
| *H04W 4/70* | (2018.01) |
| *H04W 88/16* | (2009.01) |
| *H04W 4/42* | (2018.01) |
| *H04L 29/08* | (2006.01) |

(52) U.S. Cl.
CPC ........ *G06Q 10/0833* (2013.01); *H04W 4/029* (2018.02); *H04W 4/70* (2018.02); *H04L 67/12* (2013.01); *H04W 4/42* (2018.02); *H04W 88/16* (2013.01)

(58) Field of Classification Search
CPC .... G06Q 10/0833; G06Q 10/08; H04W 4/027
See application file for complete search history.

(56) References Cited

U.S. PATENT DOCUMENTS

| | | | |
|---|---|---|---|
| 2006/0020528 A1 | 1/2006 | Levenson et al. | |
| 2007/0008120 A1* | 1/2007 | Smith | G06Q 10/06 340/539.26 |
| 2008/0007398 A1 | 1/2008 | DeRose et al. | |

(Continued)

FOREIGN PATENT DOCUMENTS

WO    2014-131021 A2    8/2014

OTHER PUBLICATIONS

S. Mahlknecht and S. A. Madani, "On Architecture of Low Power Wireless Sensor Networks for Container Tracking and Monitoring Applications," 2007 5th IEEE International Conference on Industrial Informatics, Vienna, Austria, 2007, pp. 353-358 (Year: 2007).*

(Continued)

*Primary Examiner* — George Chen
*Assistant Examiner* — Wayne S. Murray
(74) *Attorney, Agent, or Firm* — Schwegman Lundberg & Woessner, P.A.

(57) ABSTRACT

Technologies for managing the security and custody of assets in transit are described. In some embodiments, the technologies include an IoT gateway that can make intelligent decisions concerning the status of assets over which it has custody, e.g., based on sensor data received from IoT devices associated with those assets. Technologies for managing the transfer of custody of assets between responsible parties (e.g., multiple gateways) are also described.

37 Claims, 17 Drawing Sheets

(56) References Cited

U.S. PATENT DOCUMENTS

| | | | | |
|---|---|---|---|---|
| 2008/0040244 A1* | 2/2008 | Ricciuti | ............... | G06Q 10/08 |
| | | | | 705/28 |
| 2009/0160646 A1* | 6/2009 | Mackenzie | ........... | G06Q 10/08 |
| | | | | 340/572.1 |
| 2012/0249326 A1* | 10/2012 | Mostov | ................ | G08B 13/02 |
| | | | | 340/539.17 |
| 2012/0317048 A1 | 12/2012 | Brosius | | |
| 2014/0222813 A1 | 8/2014 | Yang et al. | | |
| 2014/0241354 A1 | 8/2014 | Shuman et al. | | |
| 2015/0149086 A1* | 5/2015 | Alberth, Jr. | ............ | G01C 21/10 |
| | | | | 701/519 |
| 2015/0350051 A1 | 12/2015 | Lincoln et al. | | |
| 2015/0356862 A1 | 12/2015 | Daoura et al. | | |
| 2016/0061649 A1* | 3/2016 | Hayes | ................... | G01P 15/00 |
| | | | | 702/56 |
| 2016/0078262 A1 | 3/2016 | Sun | | |
| 2016/0248481 A1 | 8/2016 | Richter et al. | | |
| 2016/0334771 A1* | 11/2016 | Laulagnet | ............. | G06Q 10/06 |
| 2016/0352673 A1 | 12/2016 | Flores et al. | | |
| 2016/0379163 A1 | 12/2016 | Johanson et al. | | |
| 2017/0180314 A1* | 6/2017 | Walker | ................... | G06F 21/00 |

OTHER PUBLICATIONS

International Search Report and Written Opinion issued in PCT Application No. PCT/US2017/034244, dated Aug. 30, 2017, 11 pages.

Office Action issued in U.S. Appl. No. 14/748,604, dated May 8, 2017, 27 pages.

"U.S. Appl. No. 14/748,604, Final Office Action dated Jun. 22, 2020", 42 pgs.

"U.S. Appl. No. 14/748,604, Response filed Aug. 8, 2017 to Non Final Office Action dated May 8, 2017", 22 pgs.

"U.S. Appl. No. 14/748,604, Final Office Action dated Nov. 8, 2017", 32 pgs.

"U.S. Appl. No. 14/748,604, Response filed May 8, 2018 to Final Office Action dated Nov. 8, 2017", 30 pgs.

"U.S. Appl. No. 14/748,604, Non Final Office Action dated May 31, 2018", 36 pgs.

"U.S. Appl. No. 14/748,604, Response filed Aug. 31, 2018 to Non Final Office Action dated May 31, 2018", 35 pgs.

"U.S. Appl. No. 14/748,604, Final Office Action dated Jan. 8, 2019", 41 pgs.

"U.S. Appl. No. 14/748,604, Response filed Jun. 10, 2019 to Final Office Action dated Jan. 8, 2019", 37 pgs.

"U.S. Appl. No. 14/748,604, Examiner Interview Summary dated Jun. 10, 2019", 3 pgs.

"U.S. Appl. No. 14/748,604, Non Final Office Action dated Jan. 23, 2020", 36 pgs.

"U.S. Appl. No. 14/748,604, Response filed Apr. 23, 2020 to Non Final Office Action dated Jan. 23, 2020", 31 pgs.

* cited by examiner

400

TECHNOLOGIES FOR MANAGING THE SECURITY AND CUSTODY OF ASSETS IN TRANSIT

CROSS REFERENCE TO RELATED APPLICATIONS

This application is a continuation in part of U.S. application Ser. No. 14/748,604, filed Jun. 24, 2015, the entire content of which is incorporated herein by reference.

FIELD

The present disclosure generally relates to technologies for managing the security and custody of assets in transit. More particularly, the present disclosure is drawn to technologies that enable in transit monitoring of the condition of assets in a shipment, and the transfer of custody of assets and/or shipments between multiple parties. Devices, systems, and methods utilizing such technologies are also described.

BACKGROUND

The worldwide logistics industry is a multitrillion dollar industry that generally focuses on organizing and managing the transit of assets (cargo) between a source and a destination. Some existing logistics systems employ a centralized information system (CIS) to store, track, and manage the movement of millions of assets around the world. In many instances those systems co-associate assets in a common shipment with one another, without significant instrumentation of the assets themselves. In some logistics systems, for example, a barcode is applied to a package in a shipment. At a source, the barcode is scanned (manually or autonomously) prior to the package being placed on a vehicle for transit, and the associated departure record is stored by a CIS to reflect departure of the package from the source. At a destination, the barcode of the package is scanned, and an associated arrival record is created and stored in the CIS to reflect arrival of the package at the destination.

Systems utilizing such an approach may suffer from one or more limitations. For example, even the most sophisticated centralized information systems inevitably suffer from discrepancies between back end records (e.g., departure/arrival records) and field reality. Due to lack of instrumentation of the packages, "blind spots" exist between the time a package is scanned for transport and when the package arrives at its destination. It may therefore be difficult to assess the presence and/or condition of a package while it is in transport. Moreover, it may be difficult for an existing logistics system to take corrective action to address circumstances (e.g., weather, aggressive/reckless vehicle operator behavior, traffic, criminal threats, etc.) that may affect the condition and/or stats of a package in transit.

One classic example is lost luggage due to human error. For example, a piece of luggage may be placed on an incorrect luggage cart after a CIS has been updated with a departure record indicating that the luggage was placed on a correct luggage cart. In another example, records in a CIS may not accurately reflect the condition of capital that is inbound to a manufacturing plant. Some part of the inbound capital may have been damaged in transit, but the CIS may be unaware of that damage until the damaged portion of the shipment is discovered upon its arrival. Likewise, lost or stolen assets may not be detected by existing CIS systems until the shipment that was supposed to contain the asset arrives at its destination and the asset is discovered to be missing. In any of those cases significant monetary, time, labor, or other costs may be incurred. Moreover, the probability that there will be a disparity between physical reality and the records of a CIS generally increases with the number of assets co-associated with a complex shipment.

The proliferation of Internet of Things (IoT) technologies creates the opportunity to enhance instrumentation of assets in transit, with a variety of associated benefits. The present disclosure leverages this opportunity to provide technologies that facilitate the management of the security and custody of assets in transit.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
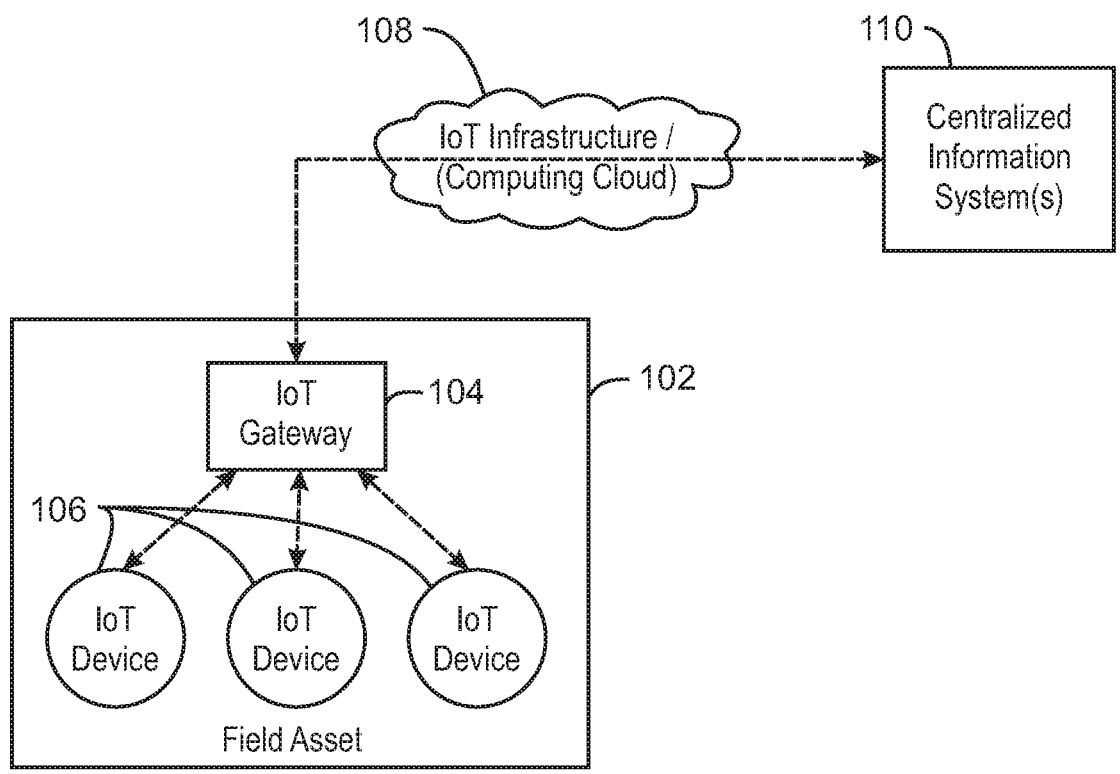
FIG. 1 is a block diagram of one example of a system for tracking shipments using internet of things (IoT) devices, in accordance with the present disclosure.

The internet of Things (IoT) is a concept in which a large number of physical items are instrumented with devices incorporating sensors, software, and network connectivity that allows such physical items to collect, locally process, and exchange data with other devices and/or information services. Early IoT deployments in the logistics space have been explored with an aim to do an incrementally better job of collecting information at the edge of delivery infrastructures to feed a centralized information system (CIS). However, it would be more effective to create edge intelligence that collects and processes information at the edge of a delivery infrastructure (e.g., a logistics network), so as to address various problems associated with discrepancies between CIS records and field reality, e.g., lost, stolen, or damaged packages. Moreover, use of IoT devices may allow various business problems and opportunities to be effectively addressed.

For example and as will be described herein, IoT devices may be implemented to make assets (e.g., packages, shipments, etc.) smart enough to find and recognize each other in a warehouse and/or while they are in transit. Such devices may also be leveraged to collect and provide data that may be used to confirm the presence of assets in transit, to identify the relative location of assets in transit (both with regard to one another and geographically), and to assess the condition of assets in transit. Such technologies may also enable the assessment of security or other threats while an asset is in transit and/or facilitate the transfer of custody between different responsible entities, such as different gateway devices, different shipping companies, etc. Such technologies can therefore address various blind spots and other challenges in existing logistics systems.

One aspect of the present disclosure relates to systems and methods that provide an autonomous edge intelligence that includes one or more IoT gateways and associated smart sensors, or IoT devices, as a separate computational space from other tracking tools, such as a central inventory database. Generally, the computational space supports new classes of applications in which IoT devices collect, process, and utilize information locally, and may dynamically form ad hoc networks with peer intelligences and infrastructure services as needed.

The technologies described herein may support goal oriented behavior in order to enable new optimizations for various operational systems, such as logistics systems. Moreover, the technologies described herein include one or more stateful gateway devices that are enabled to locally collect, analyze, and process raw data (e.g., from one or more IoT devices) in the field before forwarding results to one or more centralized systems, such as a CIS of a logistics system. Accordingly, the term "stateful gateway," as used herein, means a gateway device that is configured to store previously known or provisioned configurations about the environment in which it is placed, e.g., shipping data, and to make informed decisions about data that is collected, e.g., from one or more sensors associated with assets in a shipment. By contrast, a stateless gateway device should be understood to be a device that simply stores and forwards information without local retention, and which is unable to derive any trend related secondary information from information from raw data. Stateful gateways of varying complexity may be employed in accordance with the present disclosure, with increasingly sophisticated gateways being capable of supporting goal oriented behavior, e.g., through ad hoc relationship formation with other devices such as other stateful gateways (e.g., in peer edge intelligences), infrastructure services, etc., so as to facilitate fulfillment of one or more goals, such as those that may be specified in a service level agreement governing a shipment.

One or more sensors may collect and transmit data to a stateful gateway for analysis. The sensors may be local to (i.e., integral or physically coupled with) or remote from a stateful gateway. For example the sensors may be included in or be in the form of one or more IoT devices, which may be coupled to or otherwise associated with one or more assets in a shipment. In any case, the sensors may be configured to collect data about one or more assets in a shipment, and to convey that information to the stateful gateway, e.g. via wired or wireless communication. In some embodiments, one or more stateful gateways may have custody over a plurality of such sensors, each of which is affixed to or is otherwise associated with one or more assets in a shipment.

It is noted that in the context of the present disclosure, the terms "Internet of Things device" and "IoT device" are interchangeably used to refer to any type of device that, when operational, is capable of communicating with one or more other devices in a local and/or massively connected network where connected devices can be banded together to perform a designated function. Likewise, IoT devices that are banded together may be disbanded (e.g., at the conclusion of their performed function) to perform other functions, e.g., independently or as part of other groups.

Various components of the technologies described herein may be in the form of an IoT device. For example, any or all of the components of the system for tracking and managing the security and custody of assets in transit described herein may be in the form of an IoT device. That being said, the present disclosure often uses the terms "stateful gateway" and "gateway" are often used in contradistinction to the term internet of things (IoT) device. It should be understood that use of such terms is for the sake of clarity only, and should not be understood to mean that a stateful gateway is not (or cannot be) an IoT device. Indeed it should be understood that within the purview of the present disclosure, the stateful gateways described herein may be in the form of an IoT device or any other suitable device.

In various embodiments the stateful gateways described herein are configured to function as a centralized information system with intelligence at the edge of a broader logistics network. For example a stateful gateway may receive and monitor data from the sensors over which it has custody, and analyze that data to determine various factors that may be relevant to one or more assets in a shipment, or the shipment as a whole. For example, the stateful gateway may be configured to determine status factors pertaining to one or more assets in a shipment from relevant data provided by its associated sensors. Such status factors may include, for example, factors concerning the location of the asset (e.g., a geographic position of the asset), factors concerning the condition of the asset (e.g., acceleration forces applied to the asset, shock force applied to the asset, relative humidity, temperature, etc.), factors concerning the security of an asset, combinations thereof, and the like.

In some embodiments the stateful gateways described herein are configured to confirm the presence of an asset while it is in transit, e.g., from data reported by its associated sensors. For example, an IoT device associated with a stateful gateway may include one or more sensors, and may be configured to periodically report into, or "ping" the stateful gateway, e.g., over a wired or wireless connection. Merely from the presence or absence of such reports, the stateful gateway may determine whether or not an asset associated with a particular sensor is present. Moreover in instances where the IoT device has location services capability (e.g., includes a global position system sensor, a cellular location sensor, etc.), the IoT device may report its location by providing location coordinates corresponding to a current location of its associated asset to the stateful gateway. Regardless of the manner of implementation this capability may have a variety of practical end uses, such as detecting the theft of an asset, detecting that an asset has not been loaded onto the correct vehicle, detecting that an asset has been left behind, and the like.

Consider a scenario in which an asset in a warehouse is equipped with a smart sensor (e.g., placed inside a container containing the asset). At the warehouse, a stateful gateway device may be configured such that it has custody over a shipment containing the asset. Configuring the stateful gateway in that manner may involve, for example, associating the stateful gateway with the sensor and/or other IoT devices that are associated with the assets in the shipment, e.g., physically, in a bill of lading, etc. Once so configured, the stateful gateway may establish communication with its associated IoT devices/sensors, including the IoT device/sensor associated with the asset in question. As may therefore be appreciated, a stateful gateway associated with an IoT device that is coupled to an asset may have (e.g., electronic) custody of the asset, the IoT device associated with the asset, and/or the shipment in which the asset/IoT Device is included. Moreover, in some embodiments a stateful gateway may be considered to have custody over an asset, shipment, etc. when it is responsible for monitoring the status of the asset (vis a vis one or more IoT devices/sensors). As may be appreciated, the (electronic) custody of an asset (by a stateful gateway) does not necessarily entail physical custody of the asset. Thus, a stateful gateway may have (electronic) custody over an asset, whereas a shipping company or other responsible party may have physical custody over the asset.

Following establishment of communication, the IoT device associated with the asset may periodically report in to the stateful gateway. Such reporting may involve, for example, the transmission of a reporting message that includes the identification of the sensor in question, either alone or in combination with other information such as the identification of the asset associated with the IoT device, the geographic location of the sensor, information concerning the location/status of the asset, etc. For example when the IoT device includes a global positioning system (GPS) sensor, the reporting message may include GPS coordinates of the asset associated with the IoT Device.

The stateful gateway may be separate from or integral with a vehicle (car, truck, train, airplane, ship, etc.) that is to transport the asset, and may verify the presence of the asset on a vehicle based on the receipt of reporting messages independently provided by the IoT device(s) associated with the asset. Alternatively or additionally, the stateful gateway may be configured to query or "ping" the IoT device(s) associated with the asset, and to confirm the presence of the asset based on the receipt of a reporting message from the IoT device in response to such queries. In the latter case, the IoT device(s) associated with the asset need not be configured to independently report into the stateful gateway. In either case if the stateful gateway fails to receive a report from the IoT device(s) associated with the asset (e.g., within a specified time threshold), it may determine that there is a problem with the asset and/or that the asset is not present.

A common example would be when an asset is left off of a vehicle at the loading dock. While at the loading dock, the stateful gateway and IoT device(s) associated with the asset may be in communication with one another, but that communication may be lost as the vehicle moves away from the loading dock. In such instances, the stateful gateway may determine that that the asset is not present on the vehicle from the loss of communication (e.g., from the lack of receipt of a reporting message from an IoT device associated with the asset for greater than a predetermined time), and may report that absence, e.g., to a central information system and/or an operator of the vehicle.

In instances where the IoT device(s) used is/are equipped to provide the location of an associated asset to a stateful gateway, the stateful gateway may be configured to monitor the location of the IoT device(s) associated with the asset relative to the location of the stateful gateway and/or the vehicle in which the stateful gateway is present. When the difference between a reported location of the sensor(s) associated with the asset and the location of the stateful gateway differs by a threshold amount, the stateful gateway may determine that the asset is not present on the vehicle, and may report that absence to a CIS and/or an operator of the vehicle.

More generally, the stateful gateways described herein may receive sensor data from one or more IoT device(s) associated with assets in a shipment, and may determine a course of action from that sensor data. For example and as noted above, the stateful gateways described herein may report the presence or absence of an asset over which it has custody on a vehicle in which the stateful gateway is present and/or installed. Likewise, the stateful gateways may monitor and/or and determine other status factors that may be relevant to a shipment from sensor data. For example, the stateful gateways described herein may assess whether an asset in a shipment has been or is likely to have been damaged/compromised, based at least in part on status factors determined from sensor data provided by one or more IoT device(s). As noted previously, relevant status factors may include, for example, acceleration experienced by an asset, shock experienced by an asset, temperature experienced by an asset (e.g., over a period of time), humidity experienced by an asset, etc., combinations thereof, and the like.

The stateful gateways described herein may also determine a course of action based the assessment of such status factors. For example, the stateful gateways described herein may issue an alert based on its analysis of status factor data received from one or more IoT device(s). The alert may include the stateful gateway's assessment of the location, condition and/or integrity of one or more assets in a shipment, e.g., at the time the report was issued, and/or at an estimated time that the asset(s) will arrive at an intended destination.

The IoT gateways described herein can therefore determine and act on various status factors that may be relevant to the logistics industry, e.g., by confirming that one or more assets (e.g., co-associated assets) are present, intact, are being collected, are in transit, are secure or insecure, etc. Moreover, the IoT gateways may take (or enable other entities in a logistics system to take) corrective action to minimize monetary and other costs, e.g., by rerouting shipments (e.g., to avoid travel conditions hazardous to the status of an asset), expediting or de-emphasizing corresponding shipments (e.g., when a shipment will be late), coordinating the production of a new shipment (e.g., when assets in a shipment are lost, delayed, will be unusable at an estimated time of arrival, etc.), advising an operator to alter the operation of a vehicle in which the asset is contained, etc.

The use of IoT devices (e.g., sensors) and IoT gateways (e.g., stateful gateways) herein pushes functionality to the edge of the information structure in a logistic system, instead of relying solely on a centralized information system. This can enable querying of an asset about its location, handling, etc. at any time, including during its transport or storage. Up-to-date information about an asset may therefore be provided at any time, without relying on error prone manual intervention.

As used herein the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. In contrast, "communicatively coupled" is used to indicate that two or more elements (erg, two or more sensors, gateways, etc.) are able to communicate with one another, e.g., via wired or wireless communication.

Various embodiments of the present disclosure may be implemented in one or a combination of hardware, firmware, and software. Moreover, some embodiments may be implemented as instructions stored on a machine readable medium, which may be read and executed by a computing device to perform operations consistent with the present disclosure. A machine-readable medium may include any mechanism for storing or transmitting information in a form readable by a machine, e.g., a computer. For example, a machine-readable medium may include read only memory (ROM), random access memory (RAM), magnetic disk storage media, optical storage media, flash memory devices, among others.

As used herein the term, "embodiment" refers to an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

One aspect of the present disclosure relates to systems for tracking and managing shipments using internet of things (IoT) devices. In that regard reference is made to FIG. 1, which is a block diagram of one example of a system 100 for tracking and managing shipments in accordance with embodiments of the present disclosure. In this example embodiment the item to be tracked is asset 102, which may form all or a portion of a shipment. For example, asset 102 may be a single item or a group of items such as of a pallet of goods. Alternatively or additionally, asset 102 may be all or a portion of items in a vehicle (e.g., one or more railcars, trucks, planes, etc.) all or a portion of items in a storage location (e.g., a warehouse), combinations thereof, and the like. System 100 also includes IoT gateway 104, which in this example is in the form of or includes a computing device that continuously or periodically monitors the asset 102, e.g., while it is in transit and/or in storage.

IoT gateway 104 is configured to provide autonomous edge intelligence, e.g., to provide a field system that can assert a real time awareness of the state and condition of assets in the field rather than solely relying on centralized information system records. For example IoT gateway 104 may leverage data that is generated locally, e.g., by IoT devices 106 (and/or sensors therein) associated with asset 102, to perform analytics at a point that is local to asset 102, as opposed to filtering data from IoT devices 106 before forwarding snapshots of that data to another entity, such as centralized information system 110. Operation of IoT gateway 104 may therefore not be conditioned on the availability of a communications pathway (e.g., cellular communication, IoT infrastructure/cloud 108) to centralized information system 110. Moreover IoT gateway 104 may be relied upon to solve issues concerning an asset 102, independent of centralized information system 110.

As further shown in FIG. 1, a number of sensors, or IoT devices 106, may be coupled to the IoT gateway 104 and included in field asset 102. The IoT devices 106 may be configured to measure or otherwise determine status factors relevant to the presence and/or condition asset 102, such as but not limited to the location of asset 102, ambient temperature, temperature of asset 102, impact force applied to asset 102, acceleration experienced by an asset, humidity, operational status, or any other relevant property. IoT gateway 104 and/or IoT devices 106 may be configured to monitor such factors at any time, e.g., while asset 102 is stored, transported, or the like. IoT device(s) 106 and/or IoT gateway 104 may be configured to track such factors over time, and to analyze the relevant data for any pertinent changes. In any case, the type and nature of the parameters that are measured or otherwise determined by IoT device(s) 106 may be externally set by an entity that has (electronic or physical) custody over asset 102 while it is in storage and/or in transit, e.g., IoT gateway 104, a ship[ping company, etc.

IoT devices 106 may be in the form of or include one or more sensors that collect or generate raw information streams that include information about one or more status factors relevant to asset 102, such as those noted above. With that in mind, IoT device(s) 106 include some level of local processing capability, and may be configured, for example, to sample data from one or more sensors thereof at one or more specified sampling rates. In some embodiments the IoT device(s) 106 are configured to compare raw data to one or more thresholds, and to report the crossing of a threshold to IoT gateway 104. IoT gateway 104 processes information received from IoT devices 106 to assess the status of asset 102, such as its location, condition, security, etc.

When IoT gateway 104 determines that an alert condition is present, it may take appropriate action in an attempt to address that alert condition, e.g., by issuing one or more alerts, rerouting a shipment, emphasizing or deemphasizing corresponding shipments, etc. Alternatively or additionally, in some embodiments IoT gateway 104 may issue the outcome of its analysis to centralized information system 110, e.g., through IoT infrastructure/cloud 108, thereby prompting centralized information system 110 or another entity to take appropriate action in response to any detected alert conditions.

IoT gateway 104 may process raw data and/or reports received from IoT device(s) 106 in a variety of ways. For example, IoT gateway may perform data reduction and/or normalization operations on data received from IoT devices 106. Alternatively or additionally, IoT gateway 104 may perform threshold management and/or local analytics operations on data received from IoT devices(s) 106, so as to diagnose issues pertaining to asset 102 (i.e., to determine whether any alert conditions are present) and to recommend appropriate response actions.

The information collected by IoT gateway 104 and/or which is produced by IoT gateway 104 may be exchanged with a centralized enterprise system such as centralized information system 110. Likewise, IoT gateway 106 may share the information it collects or produces with peer field assets, e.g., other IoT gateways, field assets, and/or infrastructure services from other computational domains, e.g., to fulfill a goal programmed into IoT gateway 104. Examples of such goals include but are not limited to monitoring the status of asset 102, monitoring the security of asset 102, identifying an optimized pathway to a destination, managing the coordination of the shipment of asset 102 and any corresponding shipments, managing operation of a vehicle transporting asset 102, managing custody of an asset, etc. combinations thereof, and the like. Local processing of the data may decrease discrepancies between the true state of field assets and the records maintained by centralized information systems 110, particularly with regard to the security, presence, and/or condition of field asset 102 while it is in storage or in transit.

It may be useful to think of these implementations in terms of three computational domains. The first domain is centralized information system 110, the second domain is IoT infrastructure 108, and the third domain is IoT gateway 104 and IoT device 106. In some embodiments, IoT gateway 104 and/or IoT devices 106 may be configured to co-associate asset 102 with other assets, e.g., within a common shipment and/or storage location.

For example, IoT gateway 104 and/or IoT devices 106 may co-locate and co-associate asset 102 with another (second) asset, e.g., by finding and recognizing an IoT gateway and/or IoT devices (sensors) that are associated with the other asset and taking applicable actions. IoT Gateway 104 and/or IoT devices 106 may find or recognize other assets by directly communicating with another IoT gateway and/or other IoT devices that are associated with that attachment. Similarly, IoT Gateway 104 may be configured to co-associate a plurality of assets over which it has custody, each of which may be coupled to its own IoT device 106. For example when asset 102 is a pallet containing a plurality of packaged goods, IoT gateway 104 may co-associate all or a portion of the packages of goods with one another, and perform analytics on data provided by IoT device(s) associated with each package as a whole to determine the location, status, security, or other relevant factor of one or a combination of the packages on the pallet. IoT gateway 104 and IoT devices 106 may also be configured to find and recognize other IoT Gateways and/or IoT devices through IoT infrastructure 108 (e.g., within a warehouse) or across a computing cloud such as the Internet. Furthermore, IoT devices 106 may be configured such that they may use direct wired or wireless communications to establish an ad-hoc network with one another, as described herein.

Figure 2A:
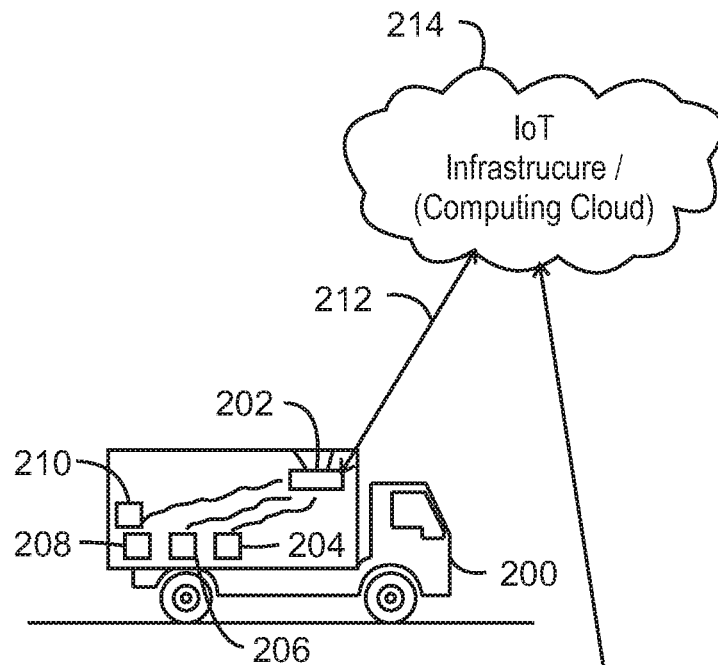
FIGS. 2A and 2B schematically illustrate two examples of the use of IoT devices to track a shipment and alert on a lost package, in accordance with the present disclosure.
Figure 2B:
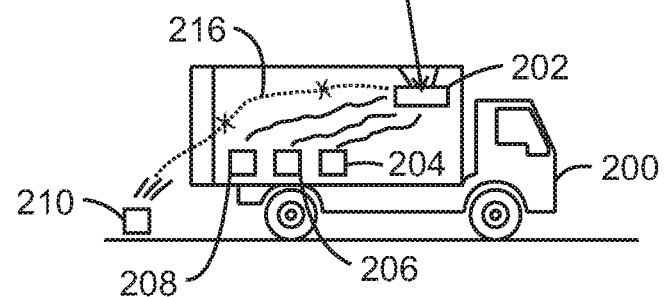

FIGS. 2A and 2B schematically depict a use case for the technologies of the present disclosure, in which an IoT gateway and IoT devices are used to monitor a shipment and issue an alert regarding a lost package. As shown in this use case a truck 200 is equipped with an IoT gateway 202, which has custody over assets in a shipment, namely packages 204, 206, 208, and 210. IoT gateway 202 includes communications circuitry that enables it to communicate with IoT infrastructure 214, e.g., via wired or wireless communication. In some embodiments, for example, IoT gateway may include a wireless wide area network (WWAN) for cellular communications 212 with an IoT infrastructure 214.

Packages 204, 206, 208, 210 include or are coupled to one or more IoT devices (not shown). For example, one or more IoT devices may be included in or on the packaging of packages 204, 206, 208, 210. In any case, the IoT devices may include one or more sensors that can collect data relevant to status factors concerning packages 204, 206, 208, 210, respectively, such as the status factors noted above. The IoT devices (e.g., sensors) may also provide information identifying each of packages 204, 206, 208, and 210, thereby allowing IoT gateway 202 to make appropriate co-associations among packages 204, 206, 208, and 210. Regardless of the data obtained, the IoT devices may be queried at configurable intervals by the IoT gateway 202, or may independently report into IoT gateway 202. Independently or in response to such queries, the IoT devices may transmit information streams including measured data collected by sensors in or associated with the IoT devices.

With specific reference to FIG. 2A, truck 200 is depicted as including all of packages 204, 206, 208, and 210 loaded therein, wherein each package is associated with and is reporting to IoT gateway 202. In other words, IoT gateway may be understood to have custody of packages 204, 206, 208, and 210 and their associated IoT device(s). Turning now to FIG. 2B, as truck 208 departs a from a source location, package 210 falls off of the truck. As a result, a communications link 216 between IoT gateway 202 and the IoT device associated with package 210 is broken, e.g. at some threshold distance from the source location. In response to detecting the break in communications link 216, IoT gateway 202 may issue a notification to a responsible party, such as the operator of truck 200, the owner of package 210, a customer, IoT infrastructure/cloud 214, or some combination thereof. Anyone who has a vested interest in the shipment of package 210 (or the shipment as a whole) may also be notified by IoT gateway 202.

The IoT devices described herein may also have additional computing power and/or other capabilities beyond reporting data recorded from one or more sensors therein.

For example, the IoT devices may be configured to enter an "SOS" mode when an alert condition is detected. An alert condition may be detected by an IoT device, e.g., based on a detected break in communication with an IoT gateway, receipt of an alert message from an IoT gateway or another source (e.g., via wired or wireless communication), combinations thereof, or the like. In the SOS mode, the IoT devices may broadcast information to aid in recovery of an asset with which the IoT device is associated, e.g., via a wireless communication protocol. For example, an IoT device associated with package 210 may broadcast an SOS alert using a cellular or other wireless signal to facilitate its recovery. Alternatively or additionally, the IoT device associated with package 210 and/or IoT gateway 202 may be configured to trigger an automatic order of a new unit to be sent to replace the items in lost package 210, e.g., without having to wait until the missing status of the items in package 210 is discovered at a later time, e.g., when truck 200 reaches its destination.

It is noted that the example shown in FIGS. 2A and 2B uses a single IoT gateway 202 on a truck 200 with a single IoT device (including one or more sensors) on each of packages 204, 206, 208, and 210. It should be understood however that the technologies described herein are not limited to that configuration, and that any suitable combination of IoT gateway(s) and IoT devices may be used. For example, a shipment may include pallets of packages, wherein each pallet has an IoT gateway that is in communication with one or a plurality of IoT devices in the packages on the pallet. The IoT gateway for each pallet may be used independently of or in conjunction with a separate IoT gateway installed in a transport vehicle, such as IoT gateway 202 on truck 200. Further, the system may be used for any type of shipment (e.g. individual packages, pallets of packages, etc.), and with any suitable infrastructure, e.g., with IoT gateways in warehouses, railcars, ships, automobiles, airports, airplanes, bicycles, etc., combinations thereof, and the like.

Figure 3:
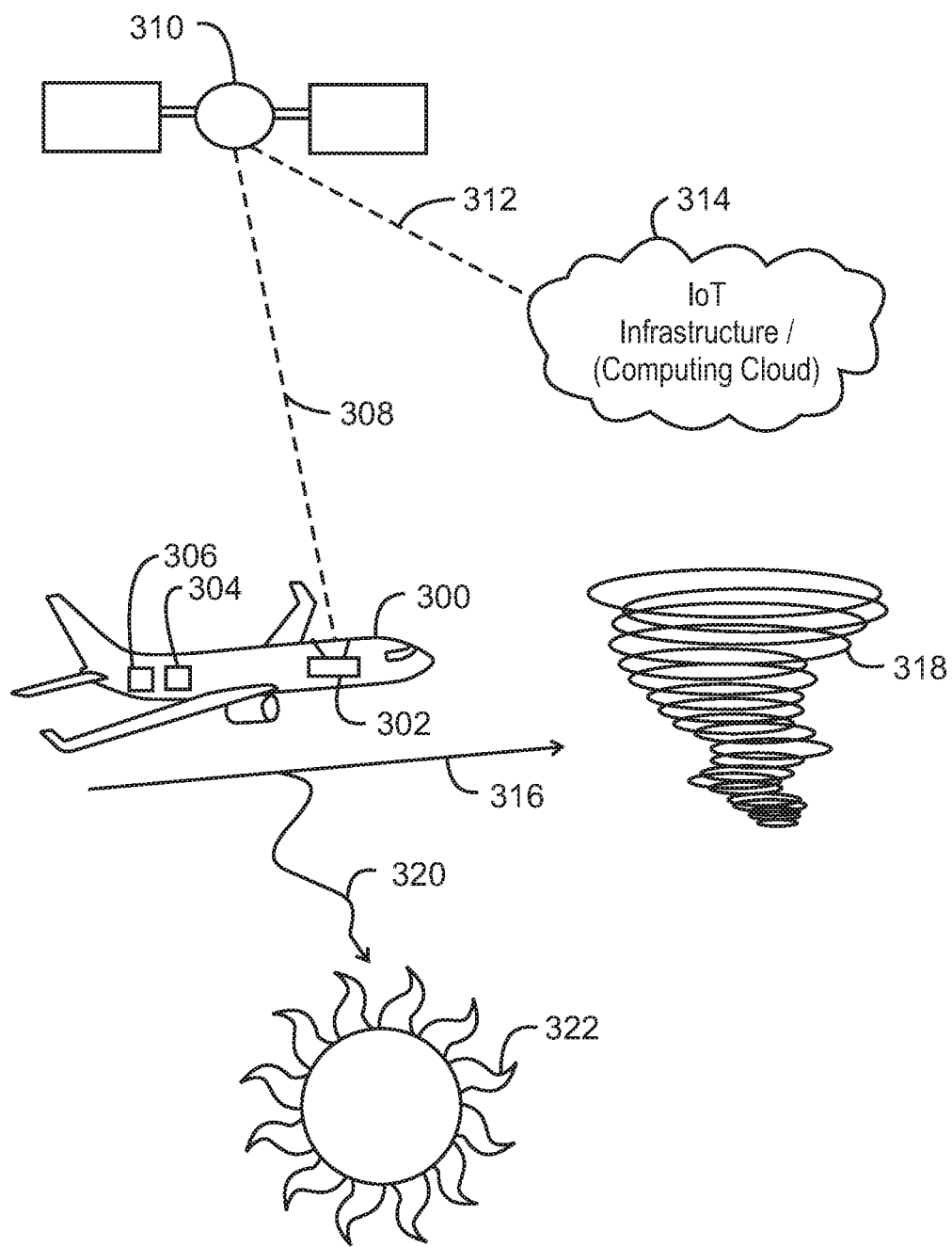
FIG. 3 schematically illustrates an example of the use of IoT devices to track a shipment that has been diverted due to bad weather, in accordance with the present disclosure.

FIG. 3 schematically depicts another example use case for the technologies of the present disclosure, i.e., using IoT devices to track a shipment that has been diverted due to bad weather. In this example use case, IoT gateway 302 is installed or is otherwise present on aircraft 300, and is configured to communicate with IoT devices associated with individual packages 304 or 306, over which it has custody. The IoT gateway 302 may also have a satellite or other communications link 308 to send data to IoT infrastructure/cloud 314.

Alternatively or additionally, in some embodiments aircraft 300 may be configured to establish communication with IoT infrastructure/cloud 314, e.g., via a satellite communications link 308 with satellite 310, or another form of communications link. In such instances, aircraft 300 may be equipped to provide a local area network (e.g., a wire or wireless communications network using one or more wired or wireless communications protocol, such as an 802.11 protocol) within its cabin. In such instances, the IoT gateway within aircraft 300 may establish a wired or wireless communication link with aircraft 300, such that it may send and receive data via communication link 308. In any case, satellite 310 may have a communications link 312 to IoT infrastructure 314, and the IoT gateway within aircraft 300 may be configured to communicate messages or other data to IoT infrastructure 314 via communications links 308, 312, and satellite 310.

As further shown in FIG. 3 aircraft 300 may be ordered to travel along initial route 316, which takes aircraft 300 into bad weather 318. To address this problem, aircraft 300 may be rerouted to a new route 320 so as to stay in more favorable weather 322. In this scenario, IoT gateway 302 may send a number of different alerts when it determines the presence of one or more alert conditions. For example, sensors in IoT devices associated with packages 304, 306 may detect forces applied to packaged 304, 306 (e.g., resulting from turbulence), and report force data to IoT gateway. From that force data, IoT gateway 302 may determine that the contents of packages 304 or 306 have exceeded their shock tolerances. Alternatively when the IoT devices include sufficient processing power, they may independently evaluate force or other data, e.g., against one or more thresholds, make intelligent decisions about the condition of packages 304, 306 and/or their contents, and report such decisions to IoT gateway 302. The determination of the shock tolerances may be made by the IoT devices themselves or by the IoT gateway 302, based on sensor data and identification of the contents of packages 304, 306.

IoT devices and/or the IoT gateway within aircraft 300 may also be configured to cause the generation of an alert when environmental factors concerning the location of packages and/or the condition of their contents is/are detected. For example IoT devices and/or IoT gateway 302 may analyze force and/or acceleration data measured by force and/or accelerometer sensors within IoT devices associated with packages 304, 306, and compare the measured data to one or more first thresholds that are intentionally set lower than a second threshold that would result in damage or other undesirable effects to the content of package(s) 304, 306. The first threshold may be set to a value that is about 5, 10, 15, 20, or even 25% less than the value of the second threshold. In such instances when the IoT devices and/or IoT gateway detect that the first threshold has been exceeded (e.g., force applied to packages 304, 306 due to turbulence from bad weather 318 exceeds the first threshold), IoT gateway may issue an alert to the operator of aircraft 300, and/or to IoT infrastructure/cloud 314. In some embodiments, such an alert may provide a recommended course of action to the operator of aircraft 300 and/or to IoT infrastructure/cloud 314, e.g., to reroute aircraft around bad weather 318.

It is noted that while FIG. 3 depicts a use case involving transport of packages 304, 306 by aircraft 300, the concepts illustrated therein are not limited to aircraft shipments. Indeed it will be readily appreciated that the same or similar concepts may be applied regardless of the manner in which a package is shipped. In instances where an automobile is used to transport packages 304, 306, for example, an IoT gateway in the vehicle and IoT devices associated with packages 304, 306 may operate in substantially the same way as noted above with regard to the operation of such elements in aircraft 300. Of course, the type and nature of the sensor data monitored and analyzed by such components may differ, as may the type and nature of the alerts produced thereby. For example, sensors within IoT devices associated with packages in a vehicle may detect forces applied to packages therein, which may be due to fast, aggressive and/or erratic driving by an operator of the vehicle. In such instances when the IoT device(s) and/or IoT gateway determines that forces applied to the packages may be approaching or exceeding a threshold level that is anticipated to cause damage to the contents of such packages, the IoT gateway may issue an alert to IoT infrastructure and/or an operator of the vehicle of that condition. The alert may include a recommended course of action, e.g., that the operator operate the vehicle more carefully.

As noted above, alerts or other factors may prompt the operator of a vehicle such as aircraft 300 to reroute from an initial route 316 to an alternatively route 320, so as to avoid undesirable conditions along the initial route (e.g., bad weather 318) or for other reasons (e.g., due to a change in the destination of packages 304, 306). In such instances, IoT sensors and/or IoT gateway within the vehicle (e.g., within aircraft 300) may be configured to detect or otherwise determine that the vehicle containing packages over which it has custody has been rerouted. For example, IoT gateway 302 may receive a reroute notification message (e.g., from IoT infrastructure/cloud 314 and/or an operator of aircraft 300) that aircraft 300 has been rerouted. In such instances, IoT gateway 302 may be configured to issue one or more additional alerts based at least in part on the rerouting of packages 304, 306.

For example when IoT gateway 302 determines or otherwise learns that aircraft 300 has been rerouted, it may transmit a reroute alert message to IoT infrastructure/cloud 314. The reroute alert message may include updated information concerning the arrival of packages 304, 306 at their intended destination. The reroute alert message may also be configured to cause downstream issuance of one or more alert messages to parties interested in the arrival of packages 304, 306, such as an individual customer, manufacturing plant, etc. For example when packages 304, 306 are to be transported to a manufacturing plant, rerouting of aircraft 300 during transit may affect the time at which they packages 304, 306 will arrive at the plant. If the asset(s) in packages 304, 306 that is/are being rerouted happen to be assets upon which other shipments depend for completion of a project, it may be desirable to de-prioritize the shipments that depend on the asset(s) in packages 304, 306. Doing so could result in cost-savings from a customer's perspective as the shipment method for the other shipments may change from expedited to standard shipping. Such decisions could be made, for example, by an IoT gateway or by a third party, e.g., based on alerts issued by an IoT gateway.

As another example, packages 304, 306 may include perishable goods that are in route to a distributor. Due to rerouting of aircraft 300, the perishable goods may become unusable by the time they reach their originally intended destination. To address this issue, an IoT gateway 302 with custody over packages 304, 306, may assess the impact of the rerouting of aircraft 300 on the condition of the perishable goods therein. When IoT gateway 302 determines that the good will arrive at their intended destination in an unusable condition (e.g., past their expiration date), it may issue an alert to that effect to IoT infrastructure/cloud 314. The alert may be configured to cause IoT infrastructure/cloud 314 to disassociate the perishable goods in package(s) 304, 306 from other packages in the same shipment, and to reroute those good to a second distributor (e.g., at a closer destination) such that the perishable goods in packages 304, 306 may arrive at the second distributor in a usable condition, e.g., before their expiration date and/or without substantial spoilage. The alert issued by IoT gateway 302 may also cause IoT infrastructure 314 to cause the production of a new shipment including the same perishable goods to the original distributor, so as to reduce or minimize delays associated with the rerouting of aircraft 300.

The above use cases are just a few scenarios in transportation and logistics market where a parent-child type architecture could be utilized to address blind spots that exist in managing the shipment of packages while they are in route between a source and a destination. Those and other example use cases may be performed, for example, using the generalized architectures shown in FIGS. 4 and 5, which are described below.

Figure 4:
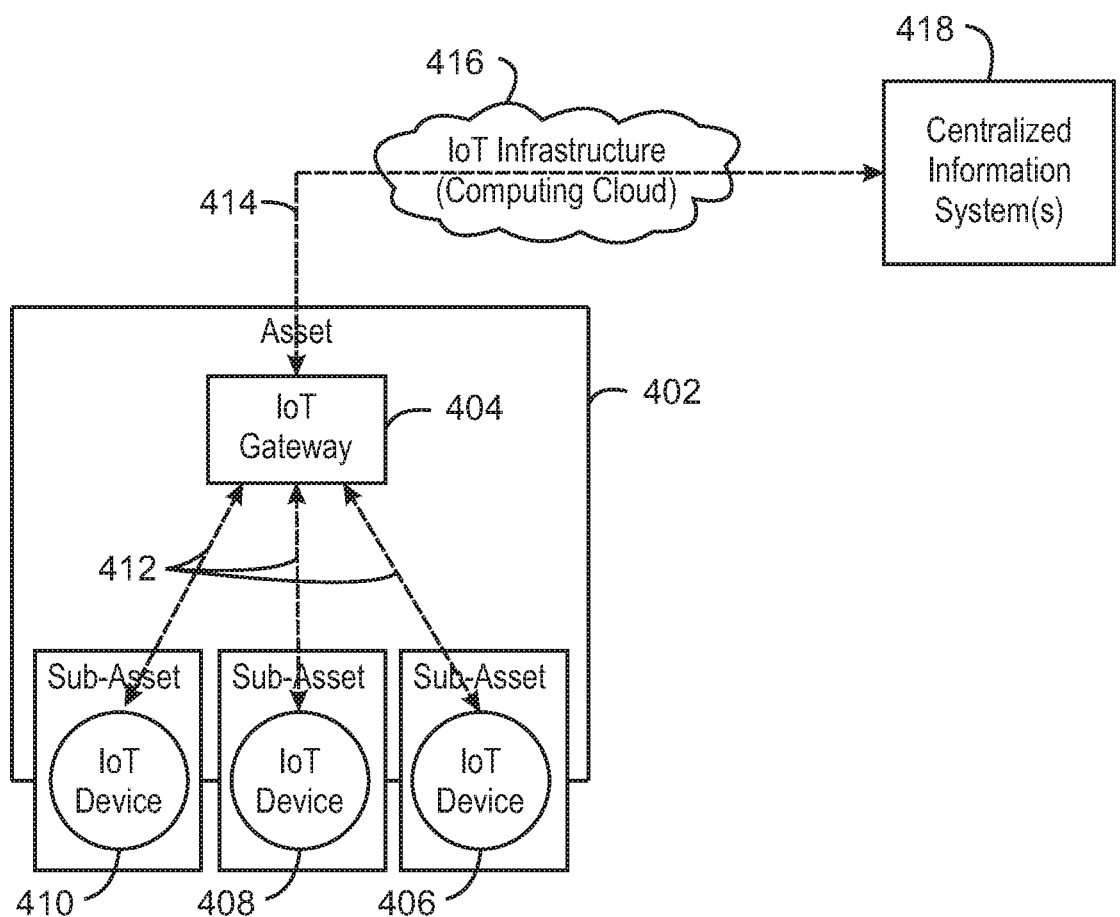
FIG. 4 is a block diagram of another example system for tracking shipments using internet of things (IoT) devices, in accordance with the present disclosure.

FIG. 4 is a block diagram of one example of a system for tracking and monitoring the status of in route shipments using internet of things IoT devices, in accordance with the present disclosure. Example system 400 includes an asset 402, which may be a pallet or other shipping unit (e.g., container, train car, etc.) which is in the custody of IoT gateway 404. In this example, IoT gateway 404 is shown as being installed and/or present within asset 402, but it should be understood that such a configuration is not required. For example, IoT gateway 404 in some embodiments is separate from asset 402. By way of example, IoT gateway may be at or installed in a storage location, on or in a transport vehicle, or the like.

In any case, asset 402 may include a number of packages, or subassets, as shown. Each of the subassets may be associated with an IoT device, such as IoT devices 406, 408, and 410. Association of an IoT device with a subasset may be accomplished, for example, by including an IoT device within a corresponding package, by attaching an IoT device to a corresponding package, or the like. In various embodiments, associating an IoT device with a corresponding package may include programming the IoT device with package information, such as but not limited to a package identification, package contents, relevant status factors to be monitored by the IoT device (e.g., location, temperature, force, acceleration, etc., and the like).

In any case IoT gateway 404 may be configured such that it has custody over all or a portion of the subassets within asset 402. In that regard, an IoT gateway may be considered to have custody over an asset or subasset when it is configured to receive data from one or more IoT devices associated with that asset or subasset. In some embodiments, an IoT gateway may have exclusive custody over an asset or subasset, meaning that only that IoT gateway is authorized to receive data from an IoT device associated with that asset or subasset. Alternatively or additionally, in some embodiments more than one IoT gateway may have shared custody over common asset or subasset.

Returning to FIG. 4, IoT gateway 404 is depicted as having custody over the subassets within asset 402. As such, IoT gateway 404 is configured to communicate with each of IoT devices 406, 408, and 410 over communications links 412, each of which may be, for example, a wired or wireless communication link. For example, each of communications links 412 may be a Bluetooth link, a Bluetooth low energy (BLE) link, a WiFi link, an Ethernet link, a near filed communication (NFC) link or any other suitable type of wired or wireless communications link. As such, IoT Gateway and IoT Devices 406, 408, 410 include communications hardware and/or software that facilitates communication between such devices via communications links 412.

IoT gateway 404 may also be configured to communicate in a wired or wireless manner with IoT infrastructure/cloud 416 and/or centralized information system 418, e.g., using communications link 414. Communications link 414 may be the same or different from the type of communications links specified as being suitable for communications links 412. For example, in addition to the type of links noted above with regard to communication links 412, communications link 414 may be in the a wireless wide area network (WWAN) link, such as a cellular or satellite communications link. Alternatively or additionally, communications link 414 in some embodiment is a wireless local area network (WLAN) link 414 to IoT infrastructure 416. In some embodiments, IoT infrastructure 416 may be a warehouse tracking system that is in communication with a centralized information system 418. In such instances, the warehouse tracking system may be configured to provide centralized information system 418 with inventory and location information for each subasset in the warehouse. The warehouse tracking system may generate that inventory and location information based at least in part on reports generated by IoT gateways having custody over assets within the warehouse (e.g., IoT gateway 404). In turn, such reports may be generated based on sensor data or other information communicated to an IoT gateway, e.g., from IoT devices associated with subassets.

More particularly, in the embodiment of FIG. 4 IoT gateway 404 may collect detailed information from IoT devices 406, 408, and 410, concerning the subassets with which such IoT devices are associated. Based on the information received, IoT gateway 404 may send reporting messages to centralized information system 418. Such reports may include, for example, details concerning the status, e.g., location and integrity, of asset 402 and the subassets contained therein.

As noted above IoT gateway 404 may be given custody over one or more IoT devices that are associated with one or more assets or subassets. For example, in the embodiment of FIG. 4 IoT gateway may have custody over IoT devices 406, 408, 410, and may be programmed to evaluate sensor readings from such devices to accomplish one or more predefined goals. For example, IoT Gateway 404 may, based on data received from IoT devices 406, 408, and 410, provide a periodic health check or an event driven alert.

IoT gateway 404 may also be used to support mission changes, such if the recipient of one or more subassets changes while asset 402 is in transit. For example, an initial recipient may sell asset 402 or one or more of the subassets therein to a second recipient while asset 402 is in transit. Alternatively or additionally, asset 402 or one or more subassets therein may be rerouted as discussed above. In such instances, IoT gateway 404 may, in response to receipt of a reassignment message or a rerouting message (e.g., from centralized information system 418, an operator of a transport vehicle or warehouse, etc.), reassign asset 402 or a relevant subasset therein to a different IoT gateway. That is, IoT gateway 404 may transfer custody over asset 402 or one or more subassets therein to a different (second) IoT gateway, wherein the second gateway is slated to accompany the reassigned/rerouted asset or subset as it is transported along to its new destination. Further details concerning the transfer of custody between gateways are provided later in conjunction with FIGS. 11-13.

In some instances, IoT gateway 404 configured to implement a geofencing plan with regard to assets over which it has custody. In that regard, IoT gateway 404 may be configured to monitor the location of asset 402 and/or subassets therein, relative to a planned route. If IoT gateway 404 determines that a current location of asset 402 or one or more subassets therein deviates from a location along the planned route by greater than a threshold amount, IoT gateway may generate and convey an appropriate alert, e.g., to an operator of a vehicle transporting asset 402 and/or centralized information. System 418. It may therefore be understood that Geofencing involves comparing a current location of a shipment to a planned route and generating an exception when a current location reading is sufficiently divergent from the planned route as to suggest a problem. Although geofencing can be implemented by a remote system that compares reported locations to a planned route, this may require a continuous communication link that may not be available. Geofencing implemented in the IoT gateway 404 may avoid the need for a continuous communications link, and may also provide an opportunity to detect exceptions faster and when a needed communications link is unavailable or is unreliable.

In some embodiments IoT gateway 404 is configured to analyze data collected by sensors on or in IoT devices 406, 408, and 410 in an effort to make determinations concerning the security, handling, and/or condition asset 402 and the subassets therein.

For example, in instances where subassets within asset 402 are a cold chained load, IoT gateway may be configured to analyze sensor (e.g., temperature, etc.) data to determine a projected shelf life of such subassets. In some embodiments, the projected shelf-life may be cross-referenced with market data, route cost estimates, time to destination estimates, etc. to determine an optimal market opportunity for asset 402 or the subassets therein. In some embodiments that analysis may be performed by IoT gateway 404, which may inform centralized information system 418 of a determined optimal market for asset 402 or the subassets therein, as well as any revisions of that determination as asset/subasset conditions evolve over time and local route related information is processed by IoT gateway 404.

In some embodiments the IoT gateways described herein may leverage sensor data reported by IoT devices regarding co-associated assets in a shipment to assess the security and/or integrity of one or more of those assets or the shipment as a whole. For example and as will be described later in conjunction with FIGS. 9A-9E, the IoT gateways described herein may be configured to analyze data concerning status factors (e.g., acceleration experienced by one or more assets) to determine whether one or more assets in a shipment have been compromised (e.g., stolen, become unsecured, etc.), to determine whether an unidentified item has been inserted into a shipment (e.g. as in a smuggling operation), combinations thereof, and the like.

Figure 5:
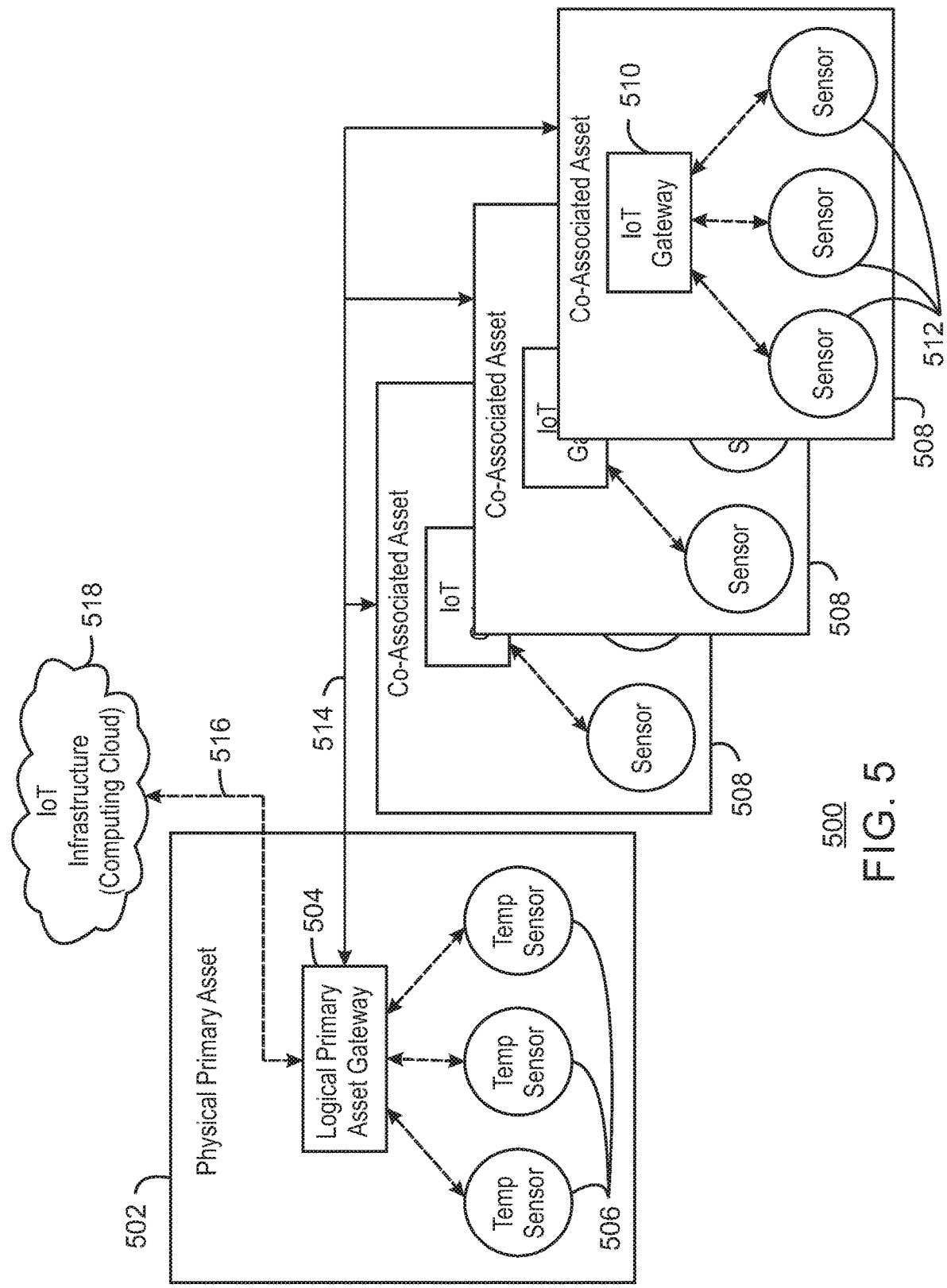
FIG. 5 is a block diagram of another example system for tracking shipments using internet of things (IoT) devices, in accordance with the present disclosure.

FIG. 5 is a block diagram of another example system 500 for tracking and monitoring the status of in route shipments using internet of things (IoT) devices in accordance with the present disclosure. As shown, system 500 includes a physical primary asset 502 that includes a logical primary asset gateway 504. Logical primary asset gateway 504 is configured to communicate with associated sensors 506. The sensors 506 may have processing power or their own, such as IoT devices, or they may be configured to simply report measured/detected values, such as temperature, to logical primary asset gateway 504.

As further shown, system 500 is configured to monitor a number of co-associated assets 508, wherein each co-associated asset is associated with a respective IoT gateway 510. The IoT gateways 510 are configured to receive and analyze data from sensors 512. The sensors 512 may be or may be included in IoT devices that have processing power, or may simply feed data to the IoT gateways 510 for processing. In any case, IoT gateways 510 are configured to communicate with logical primary asset gateway 504 over a wired or wireless communications link 514, such as a physical or radio link. The IoT gateways 510 may also be configured to communicate with communicate with each other, for example, via an ad-hoc network.

Logical primary asset gateway 504 may include communications hardware that is configured to enable communications between logical primary assert gateway 502 and IoT infrastructure 518, e.g., via a wired or wireless communications link 516. IoT gateways 510 in the co-associated assets 508 may communicate with IoT infrastructure 518 through logical primary asset gateway 504. In some embodiments, logical primary asset gateway 504 is configured to process data provided by IoT gateways 510 from sensor data obtained by sensors on or associated with co-associated assets 508, and to make decisions about the association of the co-associated, handling, security, and/or location of such assets, and the like. Moreover, logical primary asset gateway 504 may be configured to inform a centralized information system (not shown) of its decisions/findings through the IoT infrastructure 518.

Figures 6A, 6B:
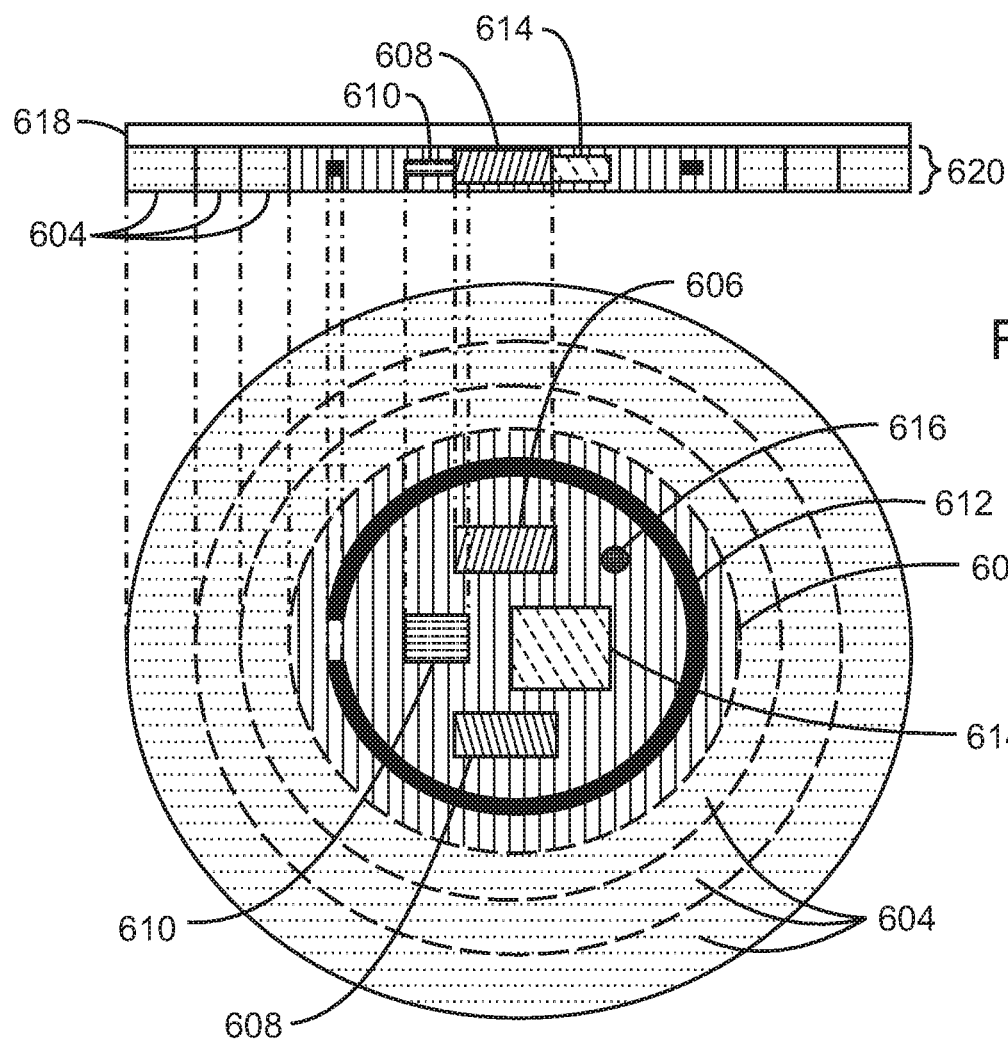
FIGS. 6A and 6B are a top and side cross sectional views, respectively, of one example of an internet of things (IoT) device in accordance with the present disclosure.

FIGS. 6A and 6B are a top view and a side cross sectional views, respectively of one example of an internet of things (IoT) device 600 that may be used in accordance with the present disclosure, e.g., to track and/or monitor the status of assets in transit. As shown, in this example embodiment IoT device 600 includes a central core 602 that includes various functional components and which may be surrounded by one or more mechanical devices 604. In some embodiments the mechanical devices 604 may be configured to facilitate attachment of IoT device to an asset itself, to a container for an asset, etc. One non-limiting example of mechanical devices 604 that may be used include rings that may facilitate matching a diameter of the device 600 to a material container, sleeve, or item, for example, by being removed to make the diameter of the device smaller than that of the material container, sleeve, or item. Alternatively, or additionally, mechanical devices 604 may include a clip or other attachment device that may be used to couple IoT device 600 to an asset, packaging containing an asset, or the like. Of course, such mechanical devices need not be used, and may be omitted for example, when central core 602 is embedded or otherwise included in a package.

Central core 602 includes a number of components to implement the functionality described herein. For example, the central core 602 may be equipped with one or more sensors such as sensors 606 and 608, for example, which may be used to determine the location of an asset, and/or to measure environmental factors affecting an asset, as described previously. Non-limiting examples of sensors that may be used include temperature sensors, force sensors, location sensors (e.g., global positioning sensors), acceleration sensors (e.g., an accelerometer), impact sensors, combinations thereof, and the like.

Central core may also include a processor 610. When used, processor 610 may be any suitable general purpose processor or application specific integrated circuit, and may be capable of executing one or multiple threads on one or multiple processor cores. Without limitation in some embodiments processor 610 is a general purpose processor, such as but not limited to the general purpose processors commercially available from INTEL® Corp., ADVANCED MICRO DEVICES®, ARM®, NVIDIA®, APPLE®, and SAMSUNG®. In other embodiments, processor 610 may be in the form of a very long instruction word (VLIW) and/or a single instruction multiple data (SIMD) processor (e.g., one or more image video processors, etc.). Still further, in some embodiments processor 610 is in the form of a microcontroller, such as a system on a chip (SoC). In any case, processor 610 may (along or in conjunction with other components of core 602) be configured to obtain data from the sensors 606 and 608 and to communicate over a wireless connection, for example, using an antenna 612.

Core 602 may further include an embedded power source, such as battery 614, which may function to power processor 610 and other components of IoT device 600, such as but not limited to sensors 606, 608. Battery 614 may be selected or configured to provide suitable power for the entire duration for the shipment of an asset with which IoT device is associated, including any periods where the asset is in storage. In some embodiment, antenna 612 may be configured such that it may receive a wireless charging signal that can be leveraged to facilitate charging of battery 614, e.g., in addition to facilitating the establishment of one or more communications links. In some embodiments, antenna 612 may be placed in a charging mode based on the detection of the presence of a charging alternating current (AC) field.

As further shown in FIG. 6, core 602 may include a beacon 616. In general, beacon 616 may be used to alerts with regard to an alert condition. For example, beacon 602 may be configured to provide a visible or auditory alert in response to the detection of an alert condition. Non-limiting examples of such alert conditions include loss of communication with an IoT gateway, environmental conditions approaching or exceeding a preset threshold (e.g., a high or low temperature threshold, a high impact threshold, a pressure threshold, an acceleration threshold, etc. combinations thereof, and the like).

In some embodiments one of the sensors 606 and 608 may be a pressure sensor, such as but not limited to a pressure sensitive capacitor or a pressure sensitive resistor. In such embodiments, the pressure sensor may be used to monitor pressure applied to an asset with which IoT device 600 is associated. For example, the pressure sensor may monitor pressure applied to the asset, and report detected pressure to an IoT gateway. The IoT gateway may compare the detected pressure data reported by the pressure sensor to a pre-determine pressure threshold. When a detected pressure exceeds the pre-determined pressure threshold, the IoT Gateway may determine that a load placed on the asset is too high, a condition which might occur, for example, if too many packages have been stacked on a package containing the asset in question. As a result, the IoT gateway may issue an alert to a responsible party, informing that part of potential damage to the asset. Of course, such processing and alerting need not occur at the IoT Gateway level, and may be performed by an IoT device itself provided that the IoT Device has sufficient processing capability.

FIG. 6B is a side cross sectional view of IoT device 600. As shown, central core 602 may be contained in an attachable device. For example, the attachable device may be disc shaped, square shaped, or in any other convenient shape. As described with respect to FIG. 6A, the device 600 may be supplied with mechanical devices 604 to assist in attaching the IoT device 600 to an asset or a container for an asset. In the illustrated embodiment, IoT device 600 may be attached to an asset or container by affixing layer 618, which may include or be in the form of a layer of adhesive. Non-limiting examples of suitable adhesives that may be used in that regard include a hot melt adhesive, a cyanoacrylate adhesive, a polyurethane adhesive, or any number of other materials. Alternatively or additionally, IoT device 600 may be configured with mechanical attachment means, such as a clip as noted above.

In any case, IoT device 600 may be hermetically sealed in an encapsulation element 620, e.g., to prevent the infiltration of liquids such as rainwater. Encapsulation element 620 and/or affixing layer 618 in some embodiments are designed to resist aggressive operating environments, for example, heat during transit, and the like.

While the present disclosure envisions embodiments wherein IoT device 600 and/or central core 602 are permanently mounted to an asset or a container for an asset, such a configuration is not required. Indeed in some embodiments, central core 602 may be contained in an attachable device that is configured to be detachably coupled to an appropriate mounting point on an asset or a package containing an asset. Such a configuration may facilitate reuse of central core 602, e.g., following delivery of an asset with which IoT device 600 is associated.

It should be understood that FIGS. 6A and 6B depict one example configuration of an IoT Device consistent with the present disclosure, and that they IoT devices described herein are not limited to that particular configuration or to the particular functional modes described above with regard to the various components contained therein. For example, IoT device 600 is not limited to the use of radio communications, and may use any suitable communications modality to communicate, e.g., with a relevant IoT gateway. In some embodiments for example, IoT device 600 may include communications hardware that facilitates communication between an IoT device and an IoT gateway via an optical link. For example, IoT device and an associated IoT gateway may include a photodiode and phototransistor combination which facilitates communication via an optical communications link. In such embodiments, information concerning the location, security, and status of an asset, may be exchanged through the optical communications link.

In some embodiments, IoT device 600 may further include a sound driver to generate sounds, such as warning beeps, or tones, when an alert condition is detected. For example, the IoT device 600 may be preprogrammed to give an audible warning, for example, if a container loses contact with an IoT gateway.

Figure 7:
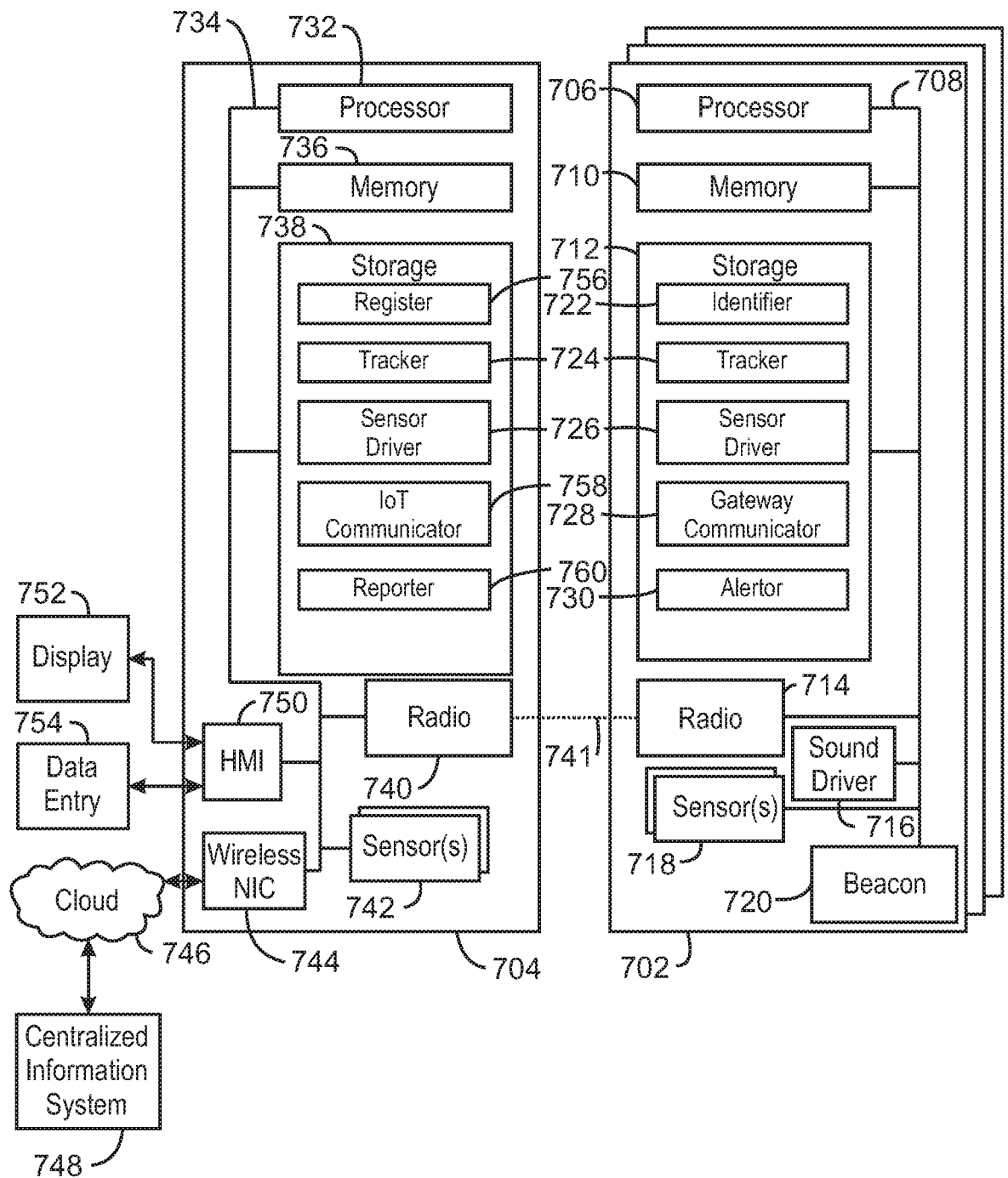
FIG. 7 is a block diagram of example IoT devices in communication with an example IoT gateway, in accordance with the present disclosure.

FIG. 7 is a block diagram of another example of IoT devices 702 in communication with an IoT gateway 704, consistent with the present disclosure. In general, this figure depicts a use case scenario in which IoT gateway 704 is used to sample sensor readings, as well as to obtain sensor readings from IoT devices 702. In the context of this example, IoT devices 702 may be in the form of a system on a chip (SoC), so as to simplify the design of the system 700. An SoC is a single integrated circuit that integrates all of the components needed for functionality. In any case, IoT Devices 702 may include a processor 706 coupled through a bus 708 to a memory 710. The memory 710 may be random access memory (RAM) used for storage of programs and data during operations. A storage device 712 may include read only memory (ROM), or other types of devices such as electrically programmable ROM (EPROM), flash memory, and the like. IoT Devices 702 may also include hardware supportive of a number of other functions, such as a radio 714, which may be a Bluetooth, WLAN, a BLE, a WWAN, or any number of other radio communication devices, as described herein.

IoT Devices 702 may also include analog to digital convertors (ADCs) and digital to analog convertors (DACs) to drive a sound driver 716, sensors 718, and beacon 720. Other functional units may also be present, such as a photodetector (not shown) which may be configured to co-operate with beacon 720 to form an optical communications link. The sound driver 716 may be configured to provide alert signals in response to detection of an alert condition, such as a loss of communication with IoT gateway 704.

Storage device 712 is a non-transitory machine readable medium that may include a number of functional blocks or modules to provide the functionality needed. The functional blocks may include an identifier module 722 that is configured to broadcast an identity and other information concerning the item, such as storage temperature. A tracker module 724 may be configured to use the radio 714 to regularly contact the IoT gateway 704, other IoT devices 702, or both, to establish the location and ensure communications are present. A sensor driver module 726 may be configured to access sensors 718 and obtain readings regarding environmental conditions, such as those noted above. A gateway communicator module 728 may be configured to send data to the IoT gateway 704, for example, through radio 714. An alert module 730 may be configured to activate the beacon 720, the sound driver 716, or both, in response to a detected alert condition. Of course, storage device 712 may be configured to facilitate other functions as well, including but not limited to infrastructure functions such as charging a battery, alerting a user to a low battery, and the like.

As shown in this embodiment, IoT gateway 704 includes a processor 732 that communicates through a bus 734 with a memory 736. The IoT gateway 704 may also be in the form of or include an SoC, though the use of an SoC is not required. In any case, IoT gateway includes a bus 734 that may include any number of bus technologies, such as a peripheral component interconnect express (PCIe) bus, a peripheral component interconnect (PC)I bus, a proprietary bus, or any number of others. IoT device 704 further includes memory 736, which may be configured for short term storage of operating programs and results, and may include dynamic RAM, static RAM, or any number of other memory technologies.

Processor 732 may be configured to communicate with storage device 738 over bus 734. In general, storage device 738 may be used for longer term storage of functional modules. That is, storage device may be in the form of a computer readable storage medium that includes computer readable instructions which when executed by processor 732, cause processor 732 (or, more generally, IoT gateway) to perform various functions consistent with the present disclosure. Non-limiting examples of devices which may be used as storage device 738 include a hard drive, an optical drive, a flash drive, or any number of other data storage technologies.

As further shown, IoT gateway 704 includes a radio 740, which may be used to communicate with IoT devices 702 and/or IoT infrastructure via a wired or wireless communications link. For example, radio 740 may facilitate communication between IoT Gateway 704 with IoT device 702 via radio link 741. In some instances the communication may be between IoT gateway 704 and individual IoT devices 702, or as part of an ad-hoc network with a group of IoT devices 702. A wireless network interface controller (NIC) 744 may be used to communicate with a computing cloud 746, such as an IoT infrastructure. A centralized information system 748 can be coupled with the cloud 746 to provide storage and data to the IoT gateway 704, as well as providing an interface to the shippers and customers, among other functions. As further shown, IoT gateway 704 further includes sensors 742. Among other things, sensors 742 may be used, for example, to monitor status factors concerning one or more assets, such as those noted above.

IoT gateway 704 may further include a human-machine interface (HMI) 750 that may be configured to couple the IoT gateway 704 to a display 752 and a data entry unit 754. Display 752 and data entry unit 754 may be integrated into a single touch screen unit, for example, in a cellphone, tablet, or local controller. In any case, HMI 750 may be used to provide alerts with regard to detected alert conditions, such as those noted above.

Storage device 738 can include a number of code blocks to provide functionality to the IoT gateway 704 in the system

700. Several of these code blocks perform analogous functions to similar code blocks in the IoT device 702, such as the tracker 724 and the sensor driver 726. A register 756 can record the identity and other information provided from the identifier 722. An IoT communicator 758 can manage communications to and between IoT devices 702, for example, directing the IoT devices 702 to establish an ad-hoc network. The IoT communicator 758 may also manage communications to other IoT gateways, for example, to reassign IoT devices 702 associated with items to those IoT gateways.

It should be understood that FIG. 7 depicts but one example of a system consistent with the present disclosure, and that system 700 is not limited to the specific devices and configurations shown. For example, the IoT devices 702 may themselves locate other IoT devices 702. Further, the IoT gateway 704 may not be a separate unit, but may be part of the infrastructure of a shipping medium, such as a truck, railroad engine, ship, and the like. Further, the IoT devices 702 may include display devices that can report identity, alerts, and other information.

Figure 8:
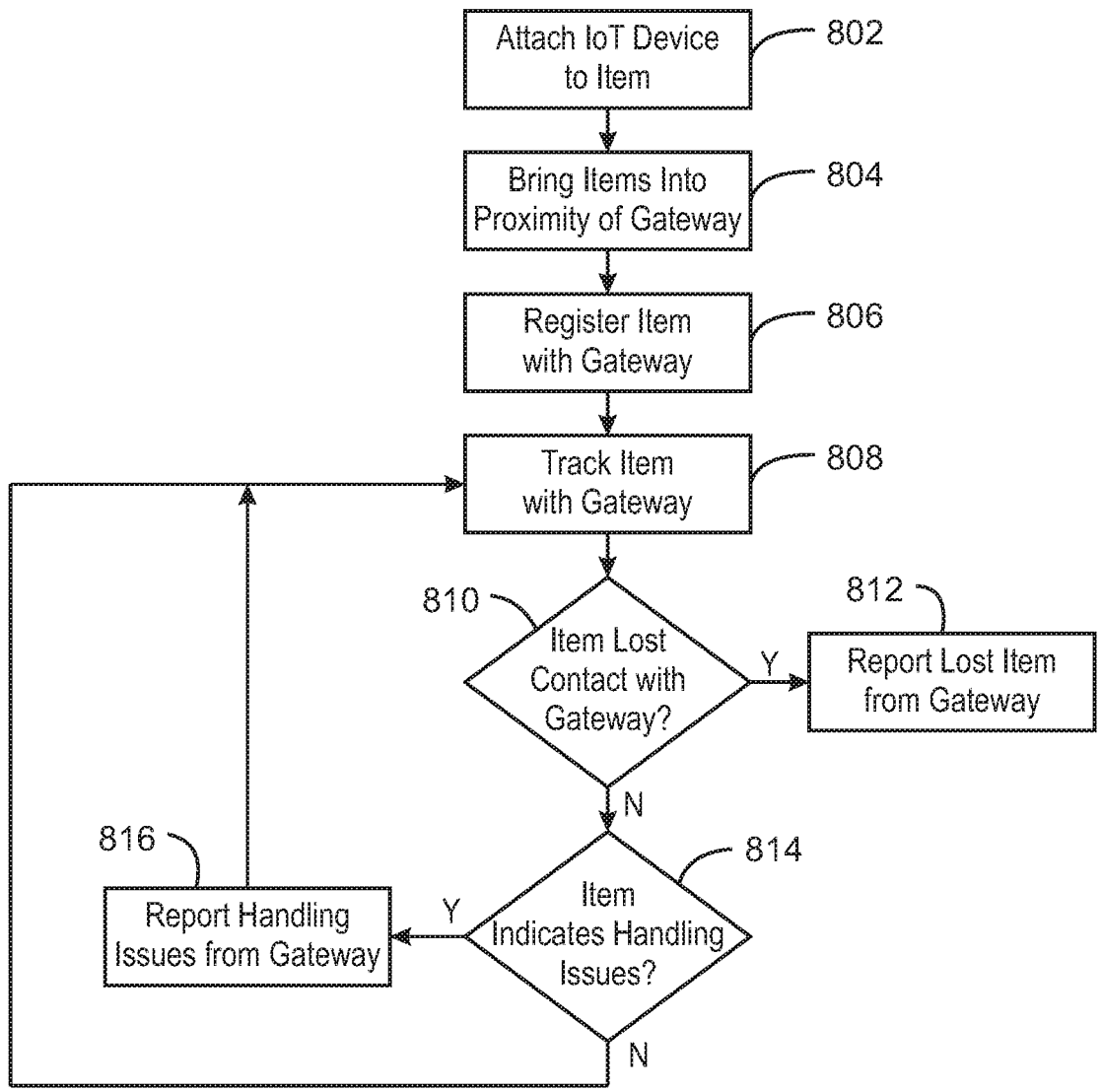
FIG. 8 is a flow diagram of operations of an example method for tracking shipments with IoT devices, in accordance with the present disclosure.

FIG. 8 is a flow chart depicting operations of one example embodiment of a method 800 for tracking and monitoring the status of assets in transit, consistent with the present disclosure. As shown, method 800 begins at block 802, pursuant to which an IoT device is attached to or otherwise associated with an item, such as a package. The method then proceeds to block 804, pursuant to which the item, including the IoT device, is brought into the proximity of an IoT gateway. At block 806, the item is registered with the IoT gateway. Upon such registration, the IoT gateway may be considered to have custody over the IoT device and its associated item. In that regard, registration of the IoT device with the IoT gateway may include, for example, transmitting an IoT device identifier to the IoT Gateway, along with an item identifier that identifies the item associated with the IoT device and any environmental or business considerations associated with the item.

The method may then proceed to block 808, pursuant to which the IoT device and IoT gateway track the item in question. For example, the IoT device and IoT gateway may track the location, status, and relevant environmental factors that are pertinent to the item in question, as discussed above.

Pursuant to block 810, a determination is made as to whether the IoT device associated with the item has lost contact with the IoT gateway. This may be due to a low battery, too great of a distance, or any number of reasons. Accordingly, in some examples, the IoT gateway may use an ad-hoc network to query other IoT devices on other items to determine if any other IoT devices are in communication with the missing item. If communication with the IoT gateway has been lost, the method may proceed to block 812, pursuant to which the IoT gateway reports the loss of the item.

If the IoT device associated with the item is still in communications with the IoT gateway the method may proceed to block 814, pursuant to which a determination is made as to whether sensor readings, from the IoT device associated with the item or the IoT gateway, indicates a handling or other (e.g., security) issue, as discussed above. If so the method may proceed to block 816, pursuant to which the IoT gateway reports the (in this case) handling issue. If no such issue is identified, however, the method may loop back to block 808 and monitoring of the item may continue.

As noted previously the technologies described herein may be implemented to monitor and assess the location, condition, and integrity of assets in a shipment or a shipment as a whole. For example and as will be explained further below, the IoT gateway/device architectures described herein may be implemented in such a way as to enable the detection of security threats that may affect assets in a shipment or a shipment as a whole. Non-limiting examples of such security threats include theft of one or more assets, tampering with one or more assets, insertion of unidentified and/or unauthorized items in a shipment, and the like.

Figure 9A:
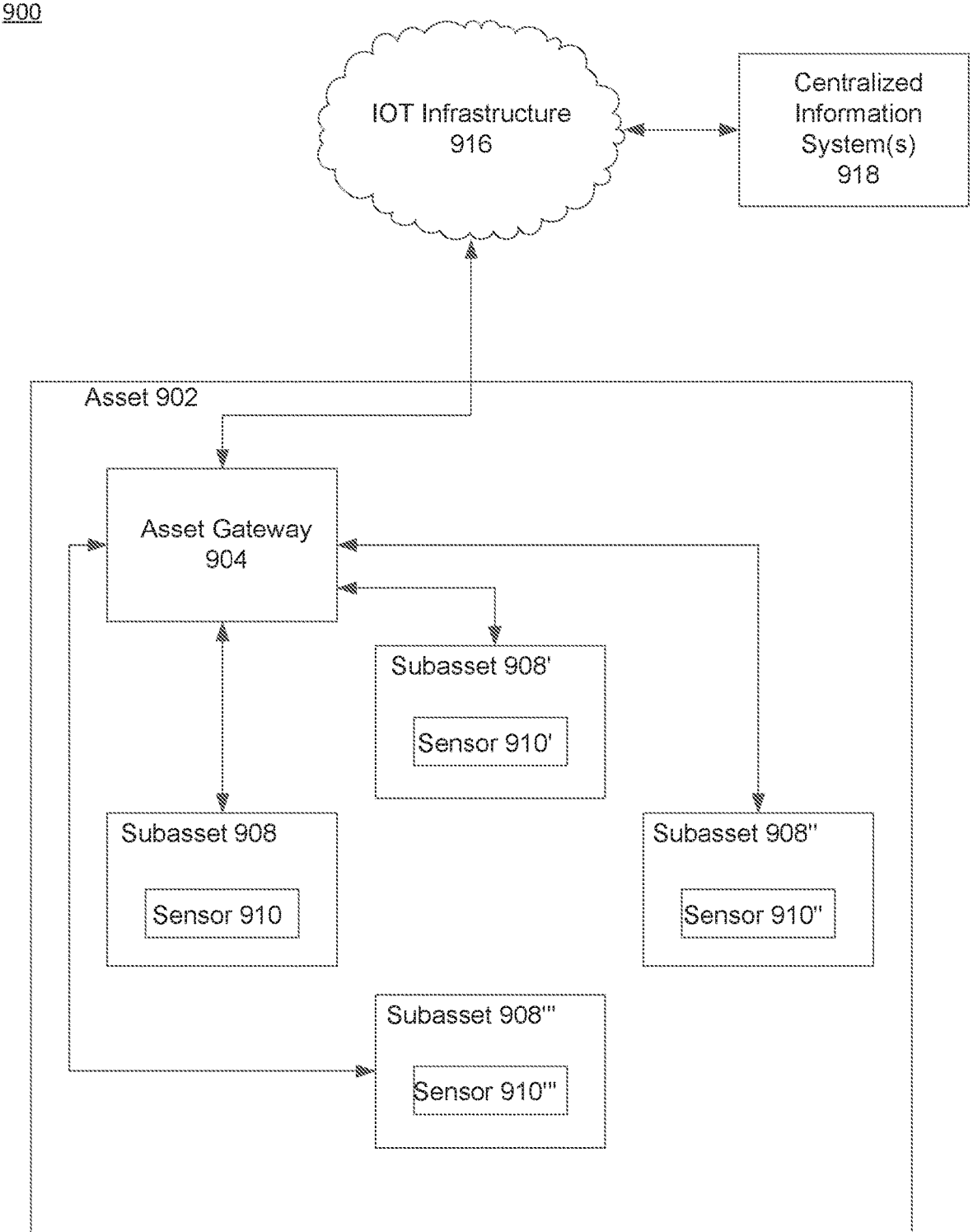
FIG. 9A-9E depict an example of a system for monitoring assets in transit for the detection of security threats, consistent with the present disclosure.

In that regard reference is made to FIGS. 9A-9E, which depict example use cases in which a system including the technologies of the present disclosure is implemented to monitor assets in transit for the detection of security threats. As shown in FIG. 9A, system 900 includes asset 902, IoT infrastructure/cloud 916, and centralized information system 918. In this embodiment, asset 902 is equipped with an IoT gateway, which for the sake of clarity is referenced herein as asset gateway 904. The configuration and operation of asset gateway 904 is substantially similar to that of the IoT gateways previously described, and therefore such common operations are not reiterated in detail. Furthermore while asset gateway 904 is shown as being contained within or installed in asset 902 (e.g., instances where asset 902 is a relatively large container or other logistics infrastructure element (e.g., a transport vehicle, storage location, etc.), it should be understood that such configuration is not required. For example, asset gateway 904 may be an IoT gateway that is independent of asset 902.

Regardless of the relationship of asset gateway 904 to asset 902, asset gateway 904 is configured such that it has custody of subassets within asset 902, wherein each subasset is equipped with one or more IoT devices/sensors. For example where asset 902 is a transport vehicle, a warehouse, etc., asset gateway 904 may have custody over all or a portion of assets within that transport vehicle, warehouse, etc. For the sake of illustration, asset gateway 904 is shown to have custody over subassets 908, 908', 908", 908''', each of which are disposed within asset 902 and each of which is associated with a corresponding sensor 910, 910, 910", 910'''. In general, sensors 910-910''' are IoT devices that operate in substantially similar manner as the IoT devices/sensors discussed above. As may therefore be appreciated, asset gateway is 904 is configured to receive sensor data from sensors 910,-910''' (e.g., via wired or wireless communication), and to analyze that sensor data for the detection of alert conditions, such as security threats relevant to asset 902, and/or to one or more subassets 908-908'''.

To facilitate the detection of security threats or other alert conditions, asset gateway 904 may be configured to group (co-associate) a plurality of subassets over which it has custody into one or more asset groups, and to analyze sensor data provided by IoT devices/sensors within an asset group relative to one another. For example in the embodiment of FIGS. 9A-9E, asset gateway 904 has custody over subassets 908-908''', and may be configured to group such subassets into a single asset group (not labeled). Asset gateway 904 may receive sensor data from sensors 910-910''' and determine status factors (e.g., location, condition, integrity, etc.) relating to the asset group as a whole or one or more of subassets 908-908''', based on sensor data received from a plurality of sensors within the asset group (i.e, from two or more of sensors 910-910'''.

By way of example, each of sensors 910-910''' may include an accelerometer that is configured to monitor acceleration applied to a respective one of subassets 908-908''' over time, e.g., while such subassets are in storage and/or in transit. Each of sensors 910-910''' may therefore produce acceleration data for a respective one of subassets 908-908''', and report that acceleration data to asset gateway 904 via one or more wired or wireless communication links. With that in mind, FIG. 9A may be understood to depict a condition in which all of subassets 908-908''' are at rest. That condition may occur, for example, while subassets are stationary in a storage location, while on a transport vehicle, etc. In any case, asset gateway 904 may analyze the acceleration data provided by sensors 910-910''' relative to one another so as to detect the occurrence of one or more alert conditions.

Figure 9B:
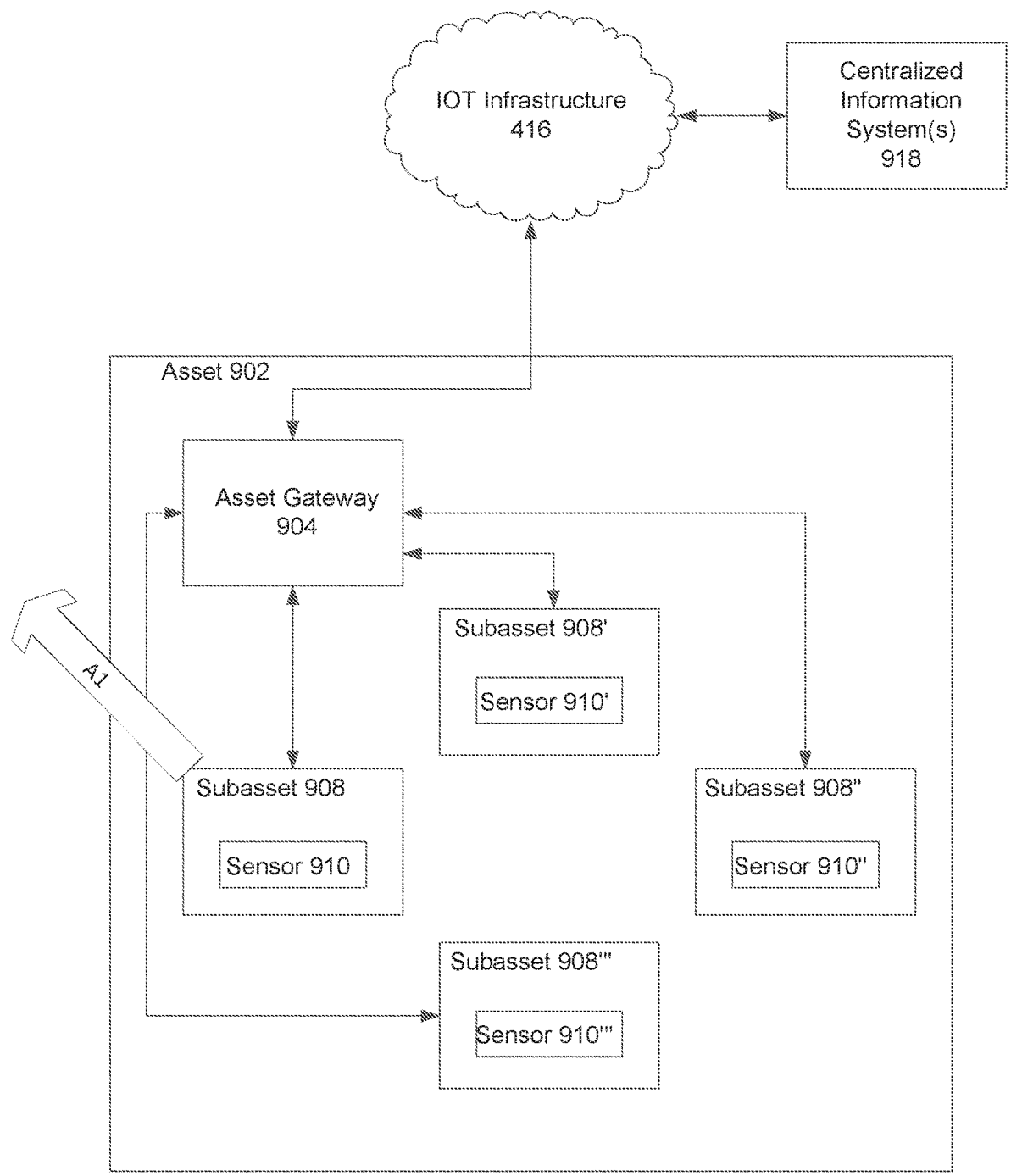

For example, sensors 910-910''' may measure and report acceleration experienced by subassets 908-908''' over a common time period, and may transmit such measurements as acceleration data to asset gateway 904. In some instances, the acceleration data may indicate that over the common time period, subasset 908 experienced acceleration along a particular vector, whereas subassets 908'-908''' did not experience acceleration. This concept is shown in FIG. 9B, which depicts subasset 908 as experiencing acceleration A1 along a first vector represented by its arrow, whereas subassets 908'-908''' are stationary (i.e., experienced an acceleration A2, A3, A4 of zero). As noted above, asset gateway 904 may be configured to compare acceleration data reported by sensors 910-910''' (i.e., from sensors in an asset group) to determine whether any alert conditions are present.

Figure 9C:
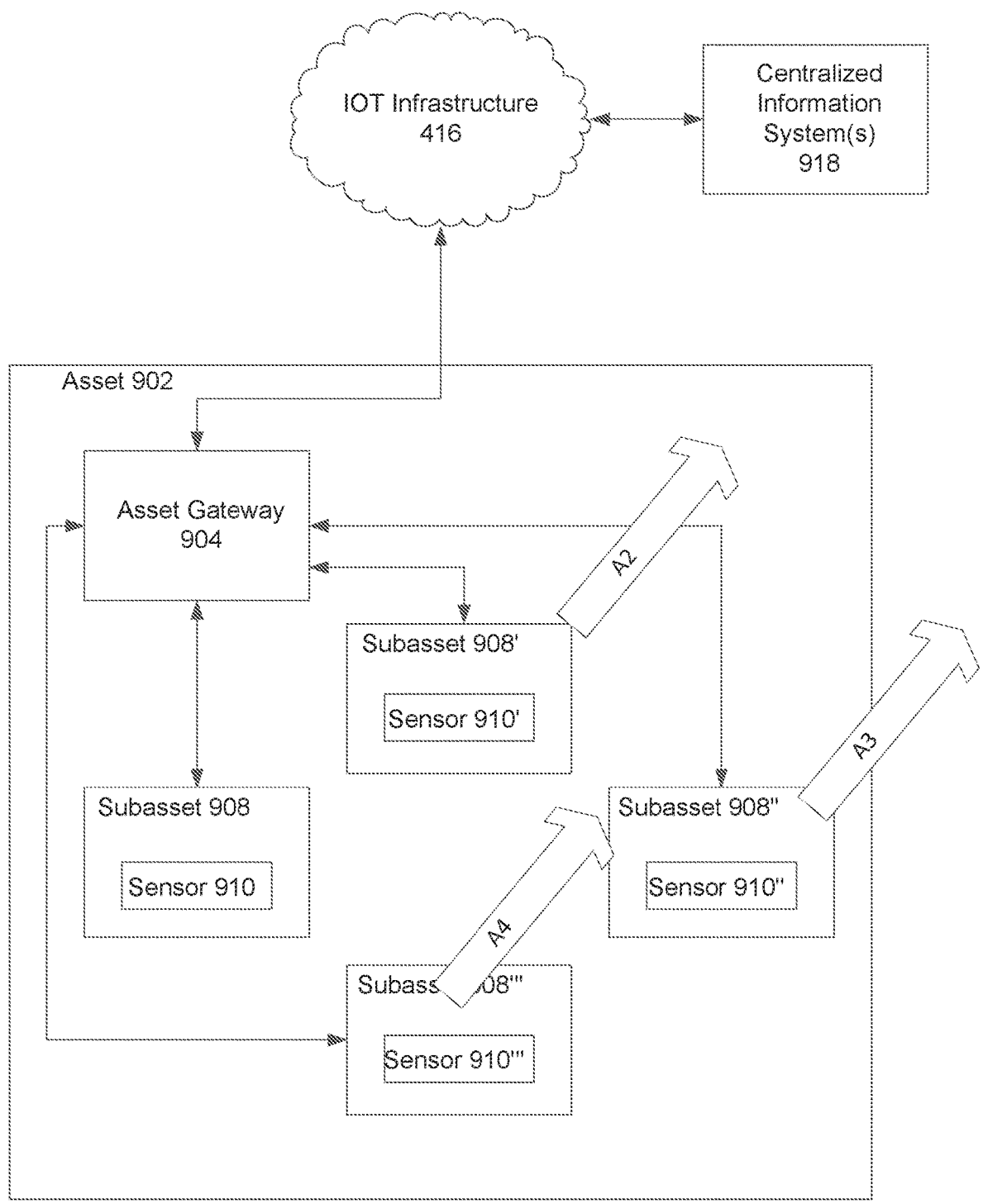

In another example, acceleration data received from sensors 910-910''' may indicate that over a common time period, subassets 908'-908''' each experienced acceleration along a particular vector, but acceleration data from sensor 910 may show that subasset 908 did not experience acceleration in that same time period. This concept is shown in FIG. 9C, which depicts subassets 908'-908''' as experiencing acceleration A2, A3, A4, respectively, along a vector indicated by their respective arrows, while subasset 908 is shown at rest. That is, sensors 910'-910''' may report that over a common time period, subassets 908'-908''' experienced acceleration A2, A3, A4, respectively, along a respective vector, whereas sensor 910 may report that subasset 908 is experience an acceleration (A1—not shown) of 0.

Figure 9D:
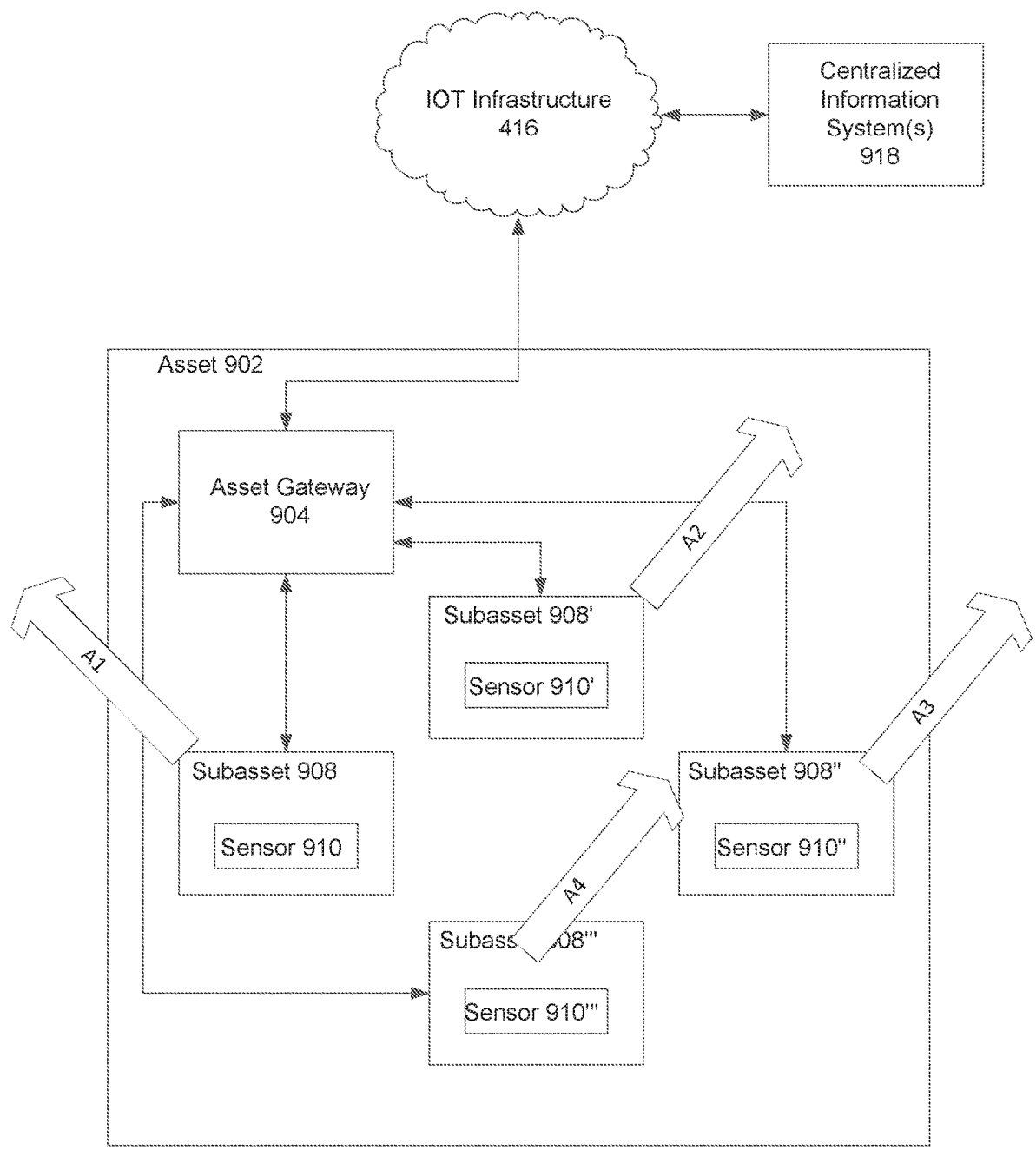

In yet another example, acceleration data received from sensors 910-910''' may indicate that over a common time period, subassets 908-908''' each experienced acceleration, but that one or more of the experienced acceleration along a different vector than the other the subassets in their subasset group. This concept is shown in FIG. 9D, which depicts subasset 908 as experiencing acceleration A1 along a first vector represented by its arrow, whereas subassets 908'-908''' are experiencing acceleration A2, A3, A4 along parallel vector paths that are different from the vector path of acceleration A1.

Figure 9E:
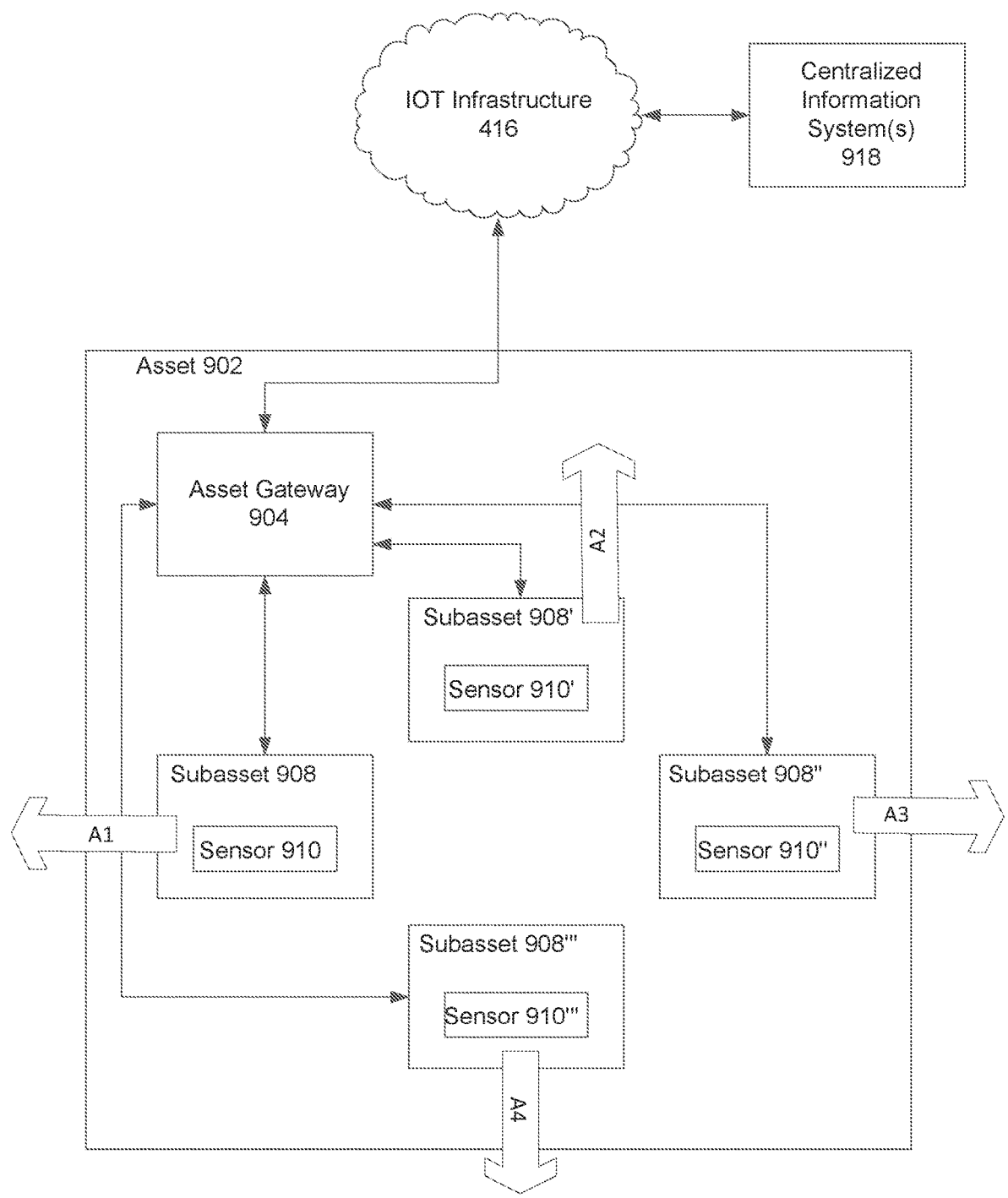

And in still another example, acceleration data received from sensors 910-910''' may indicate that over a common time period, subassets 908-908''' each experienced acceleration along different vector paths. This concept is shown in FIG. 9E, which shows subasset 908 as experiencing acceleration along A1 along a first vector path, subasset 908' as experiencing acceleration A2 along a second vector path, subasset 908'' as experiencing acceleration A3 along a third vector path, and subasset 908''' as experiencing acceleration A4 along a fourth vector path, wherein the first, second, third, and fourth vector paths are all different from one another.

With the foregoing in mind, asset gateway 904 may analyze acceleration data reported by sensors associated with assets in an asset group (in this case, sensors 910-910'''—in an effort to determine whether one or more alert conditions are present with regard to the asset group as a whole, or one or more assets within the asset group. Such analysis may involve, for example, comparing the acceleration data provided by sensors in the asset group to one another, and then deducing a logical conclusion from that data. In some embodiments, the conclusion reached by asset gateway may be guided or otherwise influenced by contextual information, e.g., provided by centralized information system 918 or another entity. The contextual information may provide information concerning an expected status of an asset group or subassets therein. For example, the contextual information may specify that an asset group or one or more assets therein is expected to be in storage, in route to a destination in a vehicle, to be removed from a vehicle, etc. In such instances, asset gateway 904 may analyze the acceleration data provided by sensors 910-910''' in view of contextual data associated with an asset group and/or one or more subassets, and determine from that analysis whether one or more alert conditions are present.

In the use case shown in FIG. 9A, for example, asset gateway may receive acceleration data from sensors 910-910''', indicating that subassets 908-908''' did not experience acceleration over a common time period. From that information along, asset gateway 904 may conclude that assets 908-908''' are in storage, within a stopped vehicle, or are traveling at a constant velocity. The conclusion reached by asset gateway 904 in some embodiments may be guided by contextual data indicating the expected status or location of an asset group containing subassets 908-908''', e.g., as being within a warehouse, as being out for delivery, as being in route on a vehicle that is likely to travel at relatively constant speed (e.g., an airplane at cruising altitude, a train, etc.).

In contrast, in the use case shown in FIG. 9B asset gateway 904 may determine that subasset 908 experienced different acceleration than the other assets within its asset group over a common time period. As a result, asset gateway 904 may conclude that a variety of alert conditions may be present with regard to subasset 908. For example, asset gateway 904 may conclude that subasset 908' has become unsecured or otherwise separated from subassets 908'-908'''. Such a condition may occur, for example, when strapping or other securing means holding subassets 908-908''' has loosened, releasing subasset 908 while retaining subassets 908'-908''' together. Alternatively if subassets 908-908''' are on a linear moving conveyor (e.g., in a warehouse), asset gateway 904 may conclude based on a comparison of acceleration A1 to acceleration A2-A4 that subasset 908 has been removed from (e.g., fallen off, stolen from, etc.) the conveyor. Consistent with the foregoing discussion, asset gateway 904 may issue an alert to a responsible party, informing them of the alert condition concerning subasset 908. Likewise asset gateway 904 may take appropriate corrective action, e.g., to facilitate recovery of subasset 908, shipment of subasset 908 on a different vehicle, adjusting the priority of shipments depending on the arrival of subasset 908, etc. As before, the conclusion reached by asset gateway 904 may be influenced by contextual information concerning an expected status of subassets within an asset group, e.g., provided by a central information system In the use of FIG. 9C, asset gateway 904 receives acceleration data from sensors 910-910''' indicating that subassets 908'-908''' each experienced acceleration along parallel vector paths, but that subasset 908 did not experience acceleration along that path. From that data and optionally contextual information, asset gateway 904 may conclude (based on a comparison of acceleration A1 to the acceleration data reported for subassets 908'-908''') that subassets 908'-908''' have all been loaded on a transport vehicle (e.g., based on a co-association of the acceleration with other data, e.g., indicating vehicle movement), whereas subasset 908 is not (or is no longer) on the vehicle. Alternatively, asset gateway 904 may conclude that there is a problem with sensor 910, or that subassets 908'-908''' have been stolen or moved. In any case, asset gateway 904 may issue an alert to a responsible party, informing them of the alert condition as discussed above. Alternatively or additionally, asset gateway may take appropriate corrective action, e.g., to facilitate recovery of subasset 908, shipment of subasset 908 on a different vehicle, adjusting the priority of shipments depending on the arrival of subasset 908, etc.

In the use of FIG. 9D, asset gateway 904 receives acceleration data from sensors 910-910''' indicating that over a common time period subassets 908'-908''' each experienced acceleration along parallel vector paths, but that subasset 908 experienced acceleration along a different vector path. From that data and optionally contextual information, asset gateway 904 may conclude (based on a comparison of acceleration A1 to the acceleration data reported for subassets 908'-908''') a variety of alert conditions are present with regard to subassets 908-908'''. For example, asset gateway 904 may conclude that subasset 908' has become unsecured or otherwise separated from subassets 908'-908'''. Such a conclusion would be reinforced, for example, if asset gateway received contextual data (e.g., from a transport vehicle or other entity) indicating that a transport vehicle carrying subassets 908-908''' was turning at the time the acceleration data was measured. Such a condition may occur, for example, when strapping or other securing means holding subassets 908-908''' has loosened, releasing subasset 908 while retaining subassets 908'908''' together. Alternatively if contextual information indicates that subassets 908-908''' are expected to be on a linear moving conveyor (e.g., in a warehouse), asset gateway 904 may conclude based on a comparison of acceleration A1 to acceleration A2-A4 that subasset 908 has been removed from (e.g., fallen off) the conveyor. As before, asset gateway 904 may issue an alert to a responsible party, informing them of the alert condition concerning subassets 908-908'''.

In the use case of FIG. 9E, asset gateway 904 receives acceleration data from sensors 910-910''' indicating that over a common time period, subassets 908'-908''' each experienced acceleration along different vector paths. For example, acceleration data may indicate that sub-assets 908-908''' each experienced acceleration along respective first, second, third, and fourth vector paths, wherein the first, second, third, and fourth vector paths all differ from one another. In such instances, asset gateway 904 may determine, based on an analysis of the acceleration data, that subassets 908-908''' moved away from one another, suggesting that an item has been inserted into the shipment. As a result, asset gateway 904 may conclude that an unidentified item has been inserted into the shipment, and may issue an appropriate alert to one or more responsible parties. As may be appreciated, this may facilitate the detection of smuggling operations, as well as the identification of scenarios in which one or more assets are placed in the wrong location (e.g., on the wrong truck) for transport.

Figure 10:
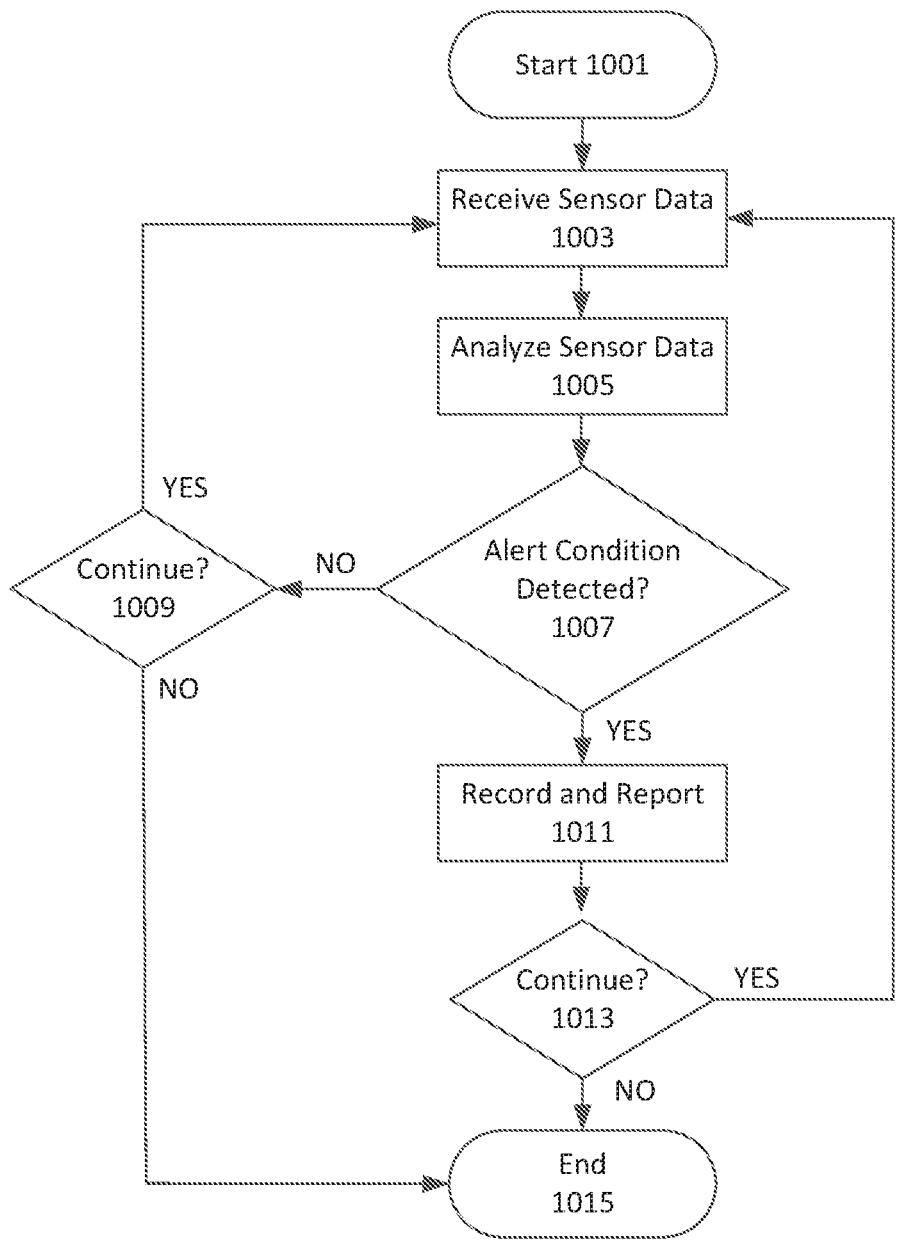
FIG. 10 is a flow diagram of operations of an example method for monitoring the assets in transit for the detection of security threats, consistent with the present disclosure.

Another aspect of the present disclosure relates to methods for monitoring the status and security of assets in transit. In that regard reference is made to FIG. 10, which is a flow diagram of example operations in accordance with a method for monitoring the status and security of assets in transit, consistent with the present disclosure. As shown, method 1000 begins at block 1001. The method then proceeds to block 1003, pursuant to which sensor data may be received from one or more sensors. The sensor data may status factors (location, temperature, acceleration, etc.) concerning one or more assets, e.g., in an asset group. In any case, the sensor data may be received by an IoT device including or coupled to such sensors, or by an IoT gateway with custody over those sensors, as discussed above.

The method may then advance to block 1005, pursuant to which the received sensor data may be analyzed, e.g., by an IoT device and/or IoT gateway. The analysis that may be performed pursuant to this block is the same as described above with regard to the analyses performed by an IoT device/gateway, and is therefore not reiterated. Optionally, contextual data concerning an asset group or one or more assets therein may also be provided. The method may then proceed to block 1007, pursuant to which a determination may be made as to whether an alert condition is present with regard to one or more assets and/or an asset group. The outcome of the operations of block 1007 may be based on the analysis of the sensor data and, optionally, the contextual data pursuant to block 1005.

If an alert condition is not detected, the method may proceed to block 1009, pursuant to which a determination is made as to whether the method is to continue. If so, the method may loop back to block 1003. But if not, the method may proceed to block 1015 and end.

Returning to block 1007, if an alert condition is detected than the method may proceed from block 1007 to block 1011. Pursuant to block 1011, the alert condition may be recorded and reported, e.g., to one or more entities with an interest in the status of an the affected asset and/or asset group. For example and as noted above, an alert may be issued to a central information system, an operator of a vehicle, or the like, and may facilitate the performance of corrective or other action that is aimed to address consequences of the detected alert condition.

Following the operations of block 1011 the method may proceed to block 1013, pursuant to which a determination may be made as to whether monitoring of the status and/or security of the asset/asset group is to continue. If so the method may loop back to block 1003, but if not the method may proceed to block 1015 and end.

Another aspect of the present disclosure relates to technologies for managing the transfer of custody of in-transit assets among multiple responsible parties and, in particular, among multiple IoT gateways. As explained previously, IoT gateways may be configured so as to take custody over one or a plurality of assets in a shipment, e.g., by assuming control over or establishing another relationship with IoT devices (sensors) coupled to or otherwise associated with such assets. Although IoT devices (sensors) are envisioned to be sufficiently inexpensive as to be suitable for one-time use applications, the cost of an IoT gateway is expected to be high enough to encourage its reuse for tracking and/or monitoring multiple different shipments over its lifetime. With that in mind, challenges exist with regard to the implementation of reusable IoT gateways.

For example, in instances where a shipping entity charters space for a shipment on a vehicle provided by a transport service, the shipping entity may provide an IoT gateway for monitoring the assets in the shipment. Once the shipment reaches its destination, reverse logistics problems exist with regard to returning the IoT gateway to the shipping entity. In scenarios where the IoT gateway remains with a certain geographic region (e.g., in a single country), the reverse logistic problem may be limited to the cost and organization of a shipment to return the IoT gateway to its owner. In other instances, an IoT gateway travel across multiple geographic regions as its associated shipment is transported from its source to its destination. For example, an IoT gateway monitoring an international shipment may travel through a first geographic region (e.g., the United States), to an second region (e.g., a duty free zone), to a third region (a foreign country). In such instances, there may be various costs associated with the transport of the IoT gateway across regional borders. For example, a foreign customs office may require payment of a fee to allow an IoT gateway to enter and/or exit a country. Alternatively or additionally, regional laws (e.g., U.S. customs laws, etc.) or other factors may prevent the transport of an IoT gateway into a foreign country.

For those and other reasons, it may be desirable to implement a system in which custody over assets in a shipment may be transferred between multiple responsible parties and, in particular, among multiple IoT gateways. In the context of international shipments for example, it may be desirable to implement a system in which regional IoT gateways are used, i.e., gateways that are limited to operation within a particular geographic region, wherein custody of asserts within a shipment may be autonomously transferred between IoT gateways. In such instances assets in a shipment may be monitored by various regional IoT gateways, wherein each of the regional IoT gateways remains within its respective geographic region. When assets in a shipment need to cross a regional boundary, e.g., a border between a first geographic region and a second geographic region, custody over those assets may be transferred from a first IoT gateway that is regional to one of the first and second geographic regions, to a second IoT gateway that is region to the other of the first and second geographic regions.

Various other use cases exist which could benefit from a system in which custody over assets in a shipment may be transferred with integrity between different IoT gateways. As one common example, assets within a shipment on a first vehicle may be initially slated for deliver to a first party at a first destination. While the shipment is in route to the first destination, at least some of the assets in the shipment are sold to second party who is located at a second destination. As a result, the first vehicle may be rerouted to meet with a second vehicle that is to deliver the sold assets to the second party, e.g., at a rendezvous point. At the rendezvous point, the sold assets may be transferred to the second vehicle, and the first and second vehicles may proceed to their respective first and second destinations.

In many solutions, recording the transfer of goods among vehicles or other entities is a laborious process that relies on error prone manual operations. CIS records concerning the transfer of goods may therefore not accurately reflect reality, even when electronic systems are used to enhance the tracking of packages. Therefore like the international shipping scenario described above, autonomous transfer of custody over assets between IoT gateways may be desirable and may address various challenges currently associated with such scenarios.

Therefore another aspect of the present disclosure relates to systems for managing the custody of assets and, in particular, to systems for managing the custody of assets between multiple responsible entities (e.g., multiple IoT gateways). More particularly, this aspect of the present disclosure relates to the transfer of custody over assets in a shipment between multiple IoT gateways. As will be described in detail later, the technologies described herein may facilitate autonomous transfer of custody between multiple IoT gateways, based at least in part on the reassignment of IoT devices/sensors associated with assets in a shipment from one IoT Device to another. In some embodiments, the technologies described herein may be leveraged to confirm physical transfer of the assets for whom custody has changed, e.g., via sensor data provided by IoT devices associated with those assets.

Figure 11:
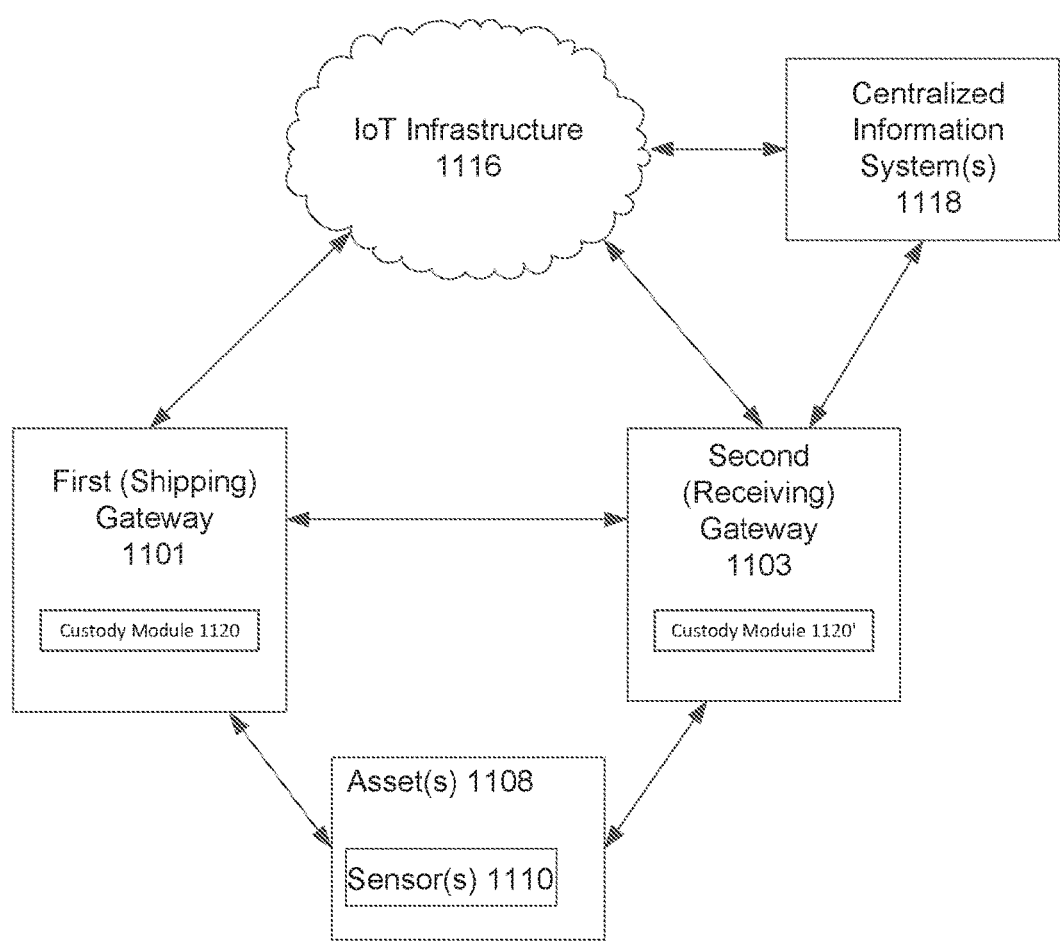
FIG. 11 is a block diagram of one example of a system for managing the custody of assets in transit, consistent with the present disclosure.

Reference is therefore made to FIG. 11, which depicts one example of a system for managing the custody of assets, consistent with the present disclosure. As shown, system 1100 includes a first (shipping) gateway 1101, a second (receiving) gateway 1103, IoT infrastructure 1116, and centralized information system(s) 1118. In general, the first and second gateways 1101, 1103 are IoT gateways that are configured in substantially the same manner as the IoT gateways discussed above with regard to FIGS. 1-10. Thus for example, gateways 1101 and 1102 are configured to receive sensor data from IoT devices (sensors) over which they have custody, to analyze that sensor data to determine status factors, alert conditions, etc. relevant to the assets associated with those sensors, and to issue alerts and/or take appropriate action upon the detection of an alert condition, as described above.

As will be described in detail below, one or both of gateways 1101, 1103 may be configured to autonomously manage the transfer of custody of assets. For example, gateways 1101, 1103 may independently or collectively manage the transfer of custody over incoming assets (i.e., assets for which the gateway is to assume custody) and outgoing assets (i.e., assets for which the gateway is to transfer custody to another party). As may be appreciated, the operations performed by gateways 1101, 1103 may depend on which role they are assuming in a transaction (i.e., shipping or receiving), and therefore the designation of gateway 1101 as a shipping gateway and gateway 1103 as a receiving gateway is arbitrary and for the sake of illustration only.

More generally, first and second gateways 1101, 1103 are configured to support the autonomous transfer of custody of asset(s) between each other, and/or with other suitable IoT gateways. In that regard, gateways 1101, 1103 may include communications hardware which allows them to send/receive custody transfer request messages and other communication over a wired or wireless communications link. Such communications may occur over a direct wired or wireless communications link between gateways 1101 and 1103, and/or via an intermediary such as sensors 1110, IoT infrastructure 1116, and/or centralized information system(s) 1118.

Gateways 1101, 1103 may therefore be equipped to communicate directly or indirectly with one another using cellular communication, wireless local area network communication (e.g., a WiFi connection), with near field communication, Bluetooth communication, communication via a ZigBee network, and/or wire communication (e.g., using an Ethernet, universal serial bus, or other protocol). In some embodiments, first (shipping) gateway 1101 may have different communications capabilities than second (receiving) gateway 1103. For example, gateway 1101 may have cellular communications capability, whereas gateway 1103 may lack that capability. In any case, gateways 1101 and 1103 may be configured to communicate with one another, either directly or via an intermediary such as centralized information system 1118, IoT infrastructure, and/or sensors 1110. Without limitation, in some embodiments gateways 1101, 1103 are configured to communicate directly with one another, such that they can cooperatively manage transfer of custody over an asset, e.g., when either or both of them lack cellular communications capability.

For the sake of illustration and ease of understanding, the following description will focus on embodiments and use cases in which first shipping gateway is a mobile gateway (i.e. a gateway which is not installed in a fixed location) that is transferring custody of asset(s) 1108 to second gateway 1103, which for the sake of example will be described as a fixed gateway (i.e., which is fixedly installed in a permanent location, such as in a vehicle, warehouse, etc.). It should be understood that such a configuration is not required, and that the technologies described herein may be leveraged to manage custody between any suitable type and number of gateways.

With that in mind, gateways 1101, 1102 each include a custody module (not shown). The custody module may be implemented in hardware (e.g. circuitry), software, or a combination of hardware and software. Without limitation, in some embodiments the custody module is implemented at least in part in hardware. Alternatively or additionally, the custody module may be in the form of one or more computer readable storage mediums having instructions stored thereon, wherein the instructions when executed cause gateways 1101, 1102, to perform custody transfer operations consistent with the present disclosure. Use of a custody module is illustrated in FIG. 11, which depicts gateways 1101, and 1103 as included custody modules 1120 and 1120', respectively. As noted previously, the custody transfer operations may differ depending on whether a gateway is operating as a shipping gateway (i.e., which is transferring custody of assets), or as a receiving gateway (i.e., which is receiving custody of assets). For convenience, the following description begins with a description of custody transfer operations from the shipping gateway side, after which custody transfer operations on the receiving gateway side are explained.

Figure 12:
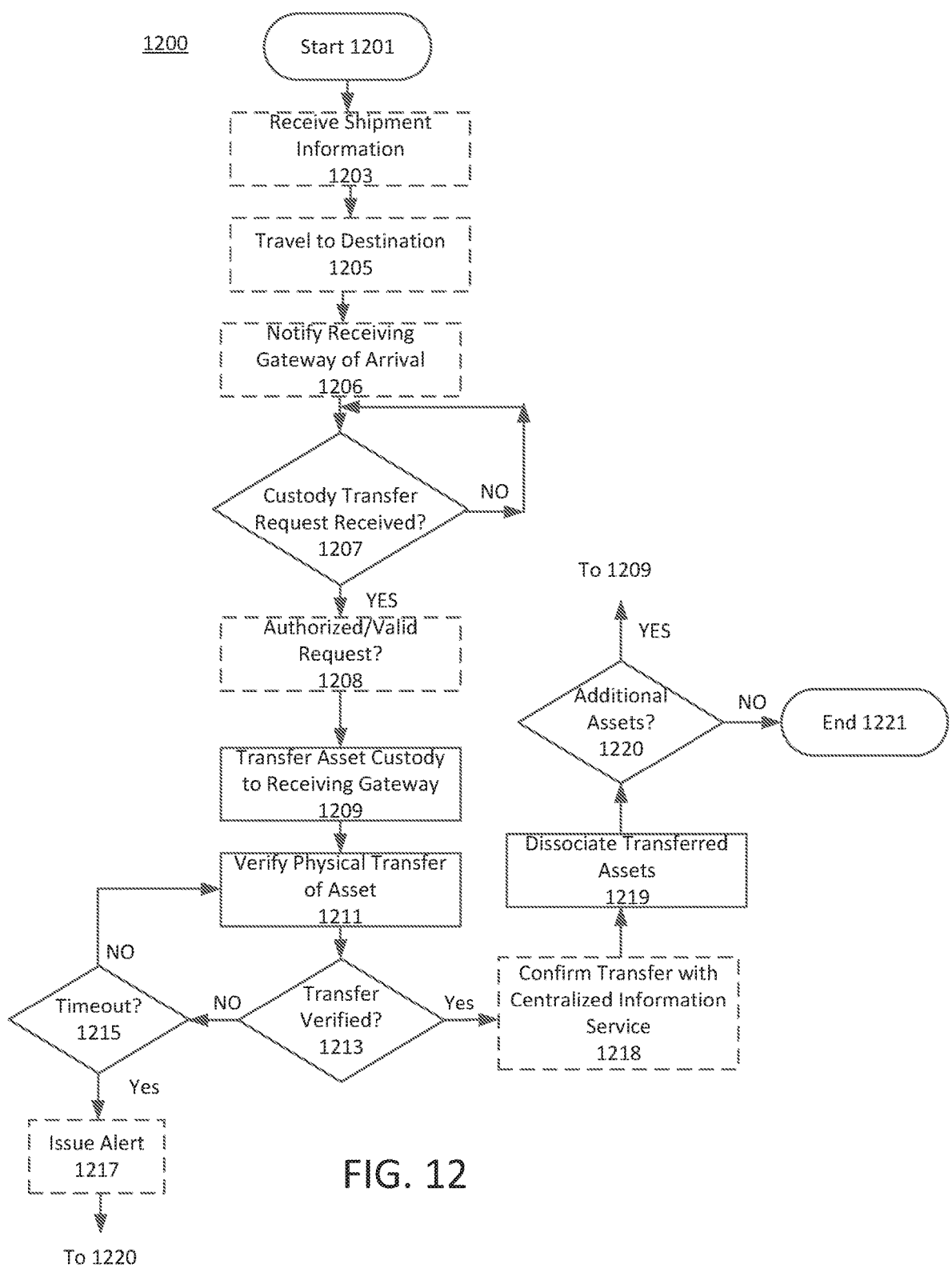
FIG. 12 is a flow diagram of example custody transfer operations which may be performed by a shipping gateway in association with a method of transferring the custody of assets consistent with the present disclosure.

Reference is therefore made to FIG. 12, which is a flow diagram of example custody transfer operations which may be performed by a shipping gateway in association with a method of transferring the custody of assets consistent with the present disclosure. As shown, method 1200 begins at block 1201. At block 1203, a shipping gateway may optionally receive shipment information that provides various details with regard to the shipment of assets (e.g., assets 1108) that are in the custody of gateway 1101. By way of example, in some embodiments the shipment information may include an identification of assets over which the shipping gateway has custody, identifiers and/or other information regarding sensors (e.g., sensors 1110) associated with those assets, an intended destination for one of more of the assets in question, route or other travel data, combinations thereof, and the like. Without limitation, the shipment information in some embodiments includes at least an identity of the assets over which the shipping gateway has custody, identifiers for each sensor/IoT Device associated with those assets, and a destination for each of those assets. In some instances, the shipment information may also specify the identity(ies) of receiving gateways that are to receive custody of one or more assets 1108, e.g., at one or more specified locations.

Following the operations of block 1203 (or if such operations are not required) the method may proceed to optional block 1205, pursuant to which the shipping gateway may travel to an intended destination for one or more of the assets over which it has custody. Accordingly, the shipping gateway may be in the form of a mobile gateway which may simply be present on a transport vehicle (e.g., as part of or in association with a shipment), or which may be fixedly installed on the transport vehicle. Once travel to the destination is complete (or if the operations of block 1205 are not required), the method may proceed to optional block 1206, pursuant to which the shipping gateway may optionally notify a receiving gateway (e.g., gateway 1103) of the arrival of the shipment at the destination. For example and with reference to FIG. 11, in response to determining that the shipment of assets 1108 has arrived at its intended destination, custody module 1120 may cause gateway 1101 to transmit an asset arrival message to gateway 1103, either directly or indirectly. In instances where gateways 1101 and 1103 can communicate directly via a direct wired or wireless communications link, custody module 1120 may cause gateway 1101 to transmit an asset arrival message to gateway 1103 via the direct wired or wireless communications link. Alternatively where gateways 1101 and 1103 are not capable of communicating directly, custody module may cause gateway 1101 to transmit the asset arrival message to one or more entities that can communicate with gateway 1103, such as IoT infrastructure 1116, centralized information system 1118, sensor(s) 1110, or the like.

When used, the asset arrival message may be configured to cause a receiving gateway (e.g., gateway 1103) to transmit a custody transfer request. In that regard the asset arrival message may include information about assets 1108 over which gateway 1101 has custody and, optionally, an identification of which of the assets for which custody is to be transferred to the receiving gateway. Alternatively the asset arrival message may simply include an identification of the assets 1108 over which gateway 1101 has custody. In such instances and as will be described below, receipt of the asset arrival message may cause the receiving gateway to identify which of assets 1108 are to change custody, and to issue one or more custody transfer request messages to the shipping gateway.

Returning to FIG. 12, following the operations of block 1206 (or if such operations are not required) the method may proceed to block 1207, pursuant to which the shipping gateway may monitor and determine whether a custody transfer request message has been received, e.g., from a receiving gateway (e.g., gateway 1103). If not, monitoring for the receipt of a custody transfer request message may continue until such a message is received. Once a custody transfer request message is received, however, the method may proceed to optional block 1208.

Pursuant to optional block 1208, the shipping gateway may determine whether or not the custody transfer request message is an authorized request. With reference to FIG. 11 for example, shipping gateway 1101 may, in response to receipt of a custody transfer request message from gateway 1103, determine whether the custody transfer request is value and/or issued from an authorized entity. For example, shipping gateway 1101 may query IoT infrastructure 1116 and/or centralized information service 1118 to confirm whether custody over the assets identified custody transfer request message is to be transferred to gateway 1103. Similarly, shipping gateway may analyze information in the custody transfer request message to confirm that custody transfer request message is issued from the correct entity. For example in instances where the custody transfer request message includes an identifier of receiving gateway 1103, shipping gateway 1101 may compare the identifier in the custody transfer request message with identifiers that may be included in previously shipment information. Alternatively or additionally, shipping gateway 1101 may transmit a received identifier to IoT infrastructure 1116 and/or centralized information system 1118 and request confirmation that transfer of custody of the assets in question to gateway 1103 is permitted.

Once shipping gateway 1101 has determined that the custody transfer request message is authorized and/or valid (or if such operations are not required), the method may proceed to block 1209, pursuant to which shipping gateway 1101 may transfer custody of one or more assets 1108 to receiving gateway 1103. The transfer for custody over such assets includes reassigning sensor(s) 1110 associated with the relevant assets 1108 to receiving gateway 1103. For example, shipping gateway 1101 may transmit (directly or indirectly) one or more custody transfer messages to receiving gateway 1103. In such instances, the custody transfer message may include information identifying the relevant sensors 1110, and optionally information that may be needed for receiving gateway to communicate with such sensors. For example where communication between a gateway and sensors 1110 is encrypted, shipping gateway 1101 may provide relevant encryption and/or decryption keys to receiving gateway 1103. Of course transfer of custody does not need to involve the transmission of a custody transfer message from shipping gateway to receiving gateway.

Following block 1209 the method may proceed to block 1211, pursuant to which the shipping gateway 1101 may confirm physical transfer of the assets for which custody was transferred to receiving gateway 1103. Shipping gateway 1101 may make that confirmation by monitoring the status and/or location of assets 1108 that have been transferred based on sensor data provided by sensors 1110, i.e., in much the same manner as discussed above in connection with FIGS. 1-10. Pursuant to block 1213, shipping gateway 1101 may determine whether (physical and electronic) custody of the assets in question has been verified. If not the method may proceed to block 1215, pursuant to which shipping gateway may determine whether a predetermined amount of time has expired. If so, the method may proceed to optional block 1217, pursuant to which shipping gateway 1101 may issue an alert to a relevant entity such as receiving gateway 1103, IoT infrastructure 1116, central information system 1118, or the like. Following issuance of an alert (or alerting is not required), the method may proceed to block 1220, which will be described later. If a timeout has not occurred pursuant to block 1215, however, the method may loop back to block 1211.

Returning to block 1213, if (physical and electronic) transfer of custody over the assets in question is verified the method may proceed to optional block 1218, pursuant to which shipping gateway may optionally confirm the successful transfer of custody with centralized information server 1118. Such operations may involve, for example, the transmission of a transfer success message from shipping gateway 1101 to centralized information system 1118, indicating that the custody transfer was successful.

Following the operations of block 1218 (or if such operations are not required), the method may proceed to block 1219, pursuant to which shipping gateway 1103 may dissociate from the assets for which custody was transferred. More particularly, shipping gateway may disassociate from sensors 1110 that are coupled to or otherwise associated with the transferred assets. Such dissociation may include, for example, ceasing to communicate with sensors 1110 associated with the transferred assets. In some embodiments, shipping gateway 1101 may disconnect from sensors 1110 associated with transferred assets in response to a disconnect message issued by receiving gateway, e.g., in accordance with the atomicity, consistency, isolation, and durability (ACID) discipline.

The method may then proceed to block 1220, pursuant to which a determination may be made as to whether there are additional assets for which a custody transfer is needed. IF so the method may loop back to block 1209. But if not, the method may proceed to block 1221 and end. At that point the shipping gateway 1101 may continue to monitor assets over which it has custody, or, if has no such assets, it may be decommissioned for reuse with another shipment.

Figure 13:
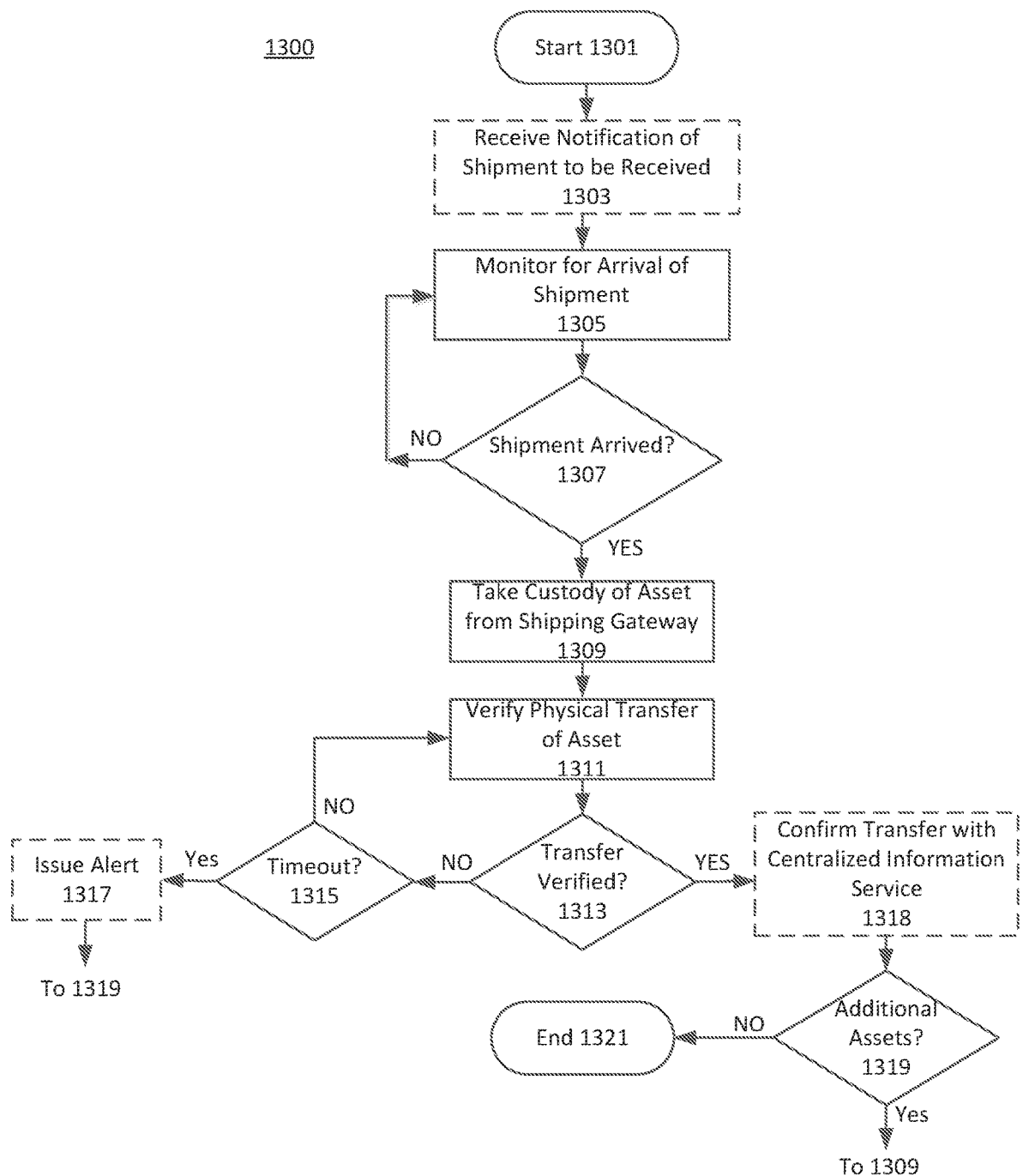
FIG. 13 is a flow diagram of example custody transfer operations which may be performed by a receiving gateway in association with a method of receiving custody of assets consistent with the present disclosure.

Reference is now made to FIG. 13, which is a flow diagram of operations of an example method for receiving custody for an asset with a receiving gateway, consistent with the present disclosure. As shown, method 1300 begins at block 1301. The method may then proceed to optional block 1303, pursuant to which a receive gateway (e.g., gateway 1103) may receive notification of a shipment that is to be received. For example, the receive gateway may receive a shipment notification message (e.g., from centralized information system 1118 or another source), identifying an inbound shipment and assets therein, including assets for which the receiving gateway is to assume custody over when after the shipment arrives. For example, in some embodiments the shipment notification message includes identification of assets within the shipment that are to be transferred to the receiving gateway, and the identification of sensors (IoT devices) associated with those assets.

Following the operations of block 1303 or if such operations are not required, the method may proceed to block 1305. Pursuant to that block the receiving gateway may monitor for the arrival of a shipment. For example and consistent with the foregoing discussion of FIG. 12, gateway 1103 may monitor for the receipt of an asset arrival message, which may be received over a wired or wireless communications link with an arriving shipping gateway (e.g., gateway 1101) and/or one or more intermediaries such as centralized information service 1118, IoT infrastructure 1116, and/or sensors 1110.

Pursuant to block 1307, a determination may be made as to whether an expected shipment has arrived. If not, the method may loop back to block 1305. But if so, the method may proceed to block 1309, pursuant to which the receiving gateway may take custody of one or more assets within the shipment. For example, gateway 1103 may, independently or in response to receipt of an asset arrival message, issue a custody transfer request message to gateway 1101. As noted previously the custody transfer request message may include the identity of assets 1108 over which gateway 1103 is to assume custody, optionally in combination with the identity of sensors 1110 associated with such assets, and/or authentication information which may be used by gateway 1101 to validate the authenticity of the custody transfer request message and/or gateway 1103. As also described above, the custody transfer request message may be configured to cause gateway 1101 to issue a custody transfer message to receiving gateway, via direct or indirect communication over a wired or wireless communications link. In such instances the custody transfer message may include the identity of assets to be transferred, and information that may be needed for gateway 1103 to establish or maintain communication with sensors 1110 associated with the assets to be transferred.

In response to receipt of the custody transfer message, gateway 1103 may establish communication with sensors associated with the relevant assets. The method may then proceed to block 1311, pursuant to which gateway 1103 may validate the physical transfer of assets over which it has assumed custody. Gateway 1103 may accomplish this, for example, by monitoring sensor data provided by sensors 1110 to determine whether the location and/or status factors of the to-be transferred assets suggests that such assets have been physically transferred.

The method may then proceed to block 1313, pursuant to which a determination may be made as to whether the electronic and physical transfer of custody over the relevant assets has been verified. If not, the method may proceed to block 1315, pursuant to which a determination may be made as to whether a threshold time period has elapsed. If not the method may loop back to block 1311, but if so the method may proceed to optional block 1317. Pursuant to optional block 1317 gateway 1103 may issue an alert to a relevant party, such as centralized information service 1118, IoT infrastructure 1116, and/or shipping gateway 1101. Following the operations of block 1317 or if such operations are not required the method may proceed to block 1319, which will be described later.

Returning to block 1313, if a determination is made that the physical and electronic transfer of custody over the relevant assets has been verified, the method may proceed to optional block 1318, pursuant to which gateway 1103 may optionally confirm the transfer of the relevant assets with centralized information service 1118. Following such operations or if such operations are not required, the method may proceed to block 1319, pursuant to which a determination may be made as to whether there are any additional assets to be transferred. If so the method may loop back to block 1309, but if not the method may proceed to block 1321 and end.

As used in any embodiment herein, the term "module" may refer to software, firmware, circuitry configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more devices, as defined previously. In some embodiments one or more modules described herein may be in the form of logic that is implemented at least in part in hardware to perform operations consistent with the present disclosure.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

EXAMPLES

The following examples pertain to further embodiments, and may comprise subject material such as a system, a device, a method, a computer readable storage medium storing instructions that when executed cause a machine to perform acts based on the method, and/or means for performing acts based on the method, as provided below.

Example 1 includes an apparatus for An apparatus for tracking a shipment including: an Internet of Things (IoT) gateway, including: a communications link to an IoT infrastructure; and a communications link to a plurality of IoT devices each disposed proximate to an asset; and the plurality of IoT devices, each including a communications link to the IoT gateway.

Example 2 incorporates the subject matter of Example 1. In this example, the apparatus includes a sensor to measure an impact on the asset.

Example 3 incorporates the subject matter of any combination of Examples 1-2. In this example, the apparatus includes a sensor to measure a temperature of the asset.

Example 4 incorporates the subject matter of any combination of Examples 1-3. In this example, the apparatus includes a sensor to measure a pressure of the asset.

Example 5 incorporates the subject matter of any combination of Examples 1-4. In this example, the apparatus includes an ad-hoc network formed between the plurality of IoT devices.

Example 6 incorporates the subject matter of any combination of Examples 1-5. In this example, the IoT gateway is to inform a centralized information system if communications to an IoT device on an asset is lost.

Example 7 incorporates the subject matter of any combination of Examples 1-6. In this example, the IoT gateway includes a wireless wide area network (WWAN) radio.

Example 8 incorporates the subject matter of any combination of Examples 1-7. In this example, the IoT gateway includes a satellite uplink/downlink.

Example 9 incorporates the subject matter of any combination of Examples 1-8. In this example, the apparatus includes an IoT gateway that includes a processor; a communications device to communicate with an IoT infrastructure; a second communications device to communicate with the plurality of IoT devices; and a storage device including instructions to direct the processor to: determine if an IoT device is in communications with the IoT gateway; and alert a centralized information system in a computing cloud if the IoT device is not in communications with the IoT gateway.

Example 10 incorporates the subject matter of any combination of Examples 1-9. In this example, the storage device of example 9 includes instructions to alert the centralized information system if the IoT device reports a sensor reading that is outside of preset limits.

Example 11 incorporates the subject matter of any combination of Examples 1-10. In this example, the apparatus includes an IoT device that includes: a processor; a communications device to communicate with the IoT gateway; and a storage device including instructions to direct the processor to: determine if the IoT device is in communications with the IoT gateway; and activate an alert if not in communication with the IoT gateway.

Example 12 incorporates the subject matter of any combination of Examples 1-11. In this example, the IoT device includes a sensor to measure an environmental condition, and the storage device includes instructions to direct the processor to inform the IoT gateway if preselect limits on the environmental condition are exceeded.

Example 13 incorporates the subject matter of any combination of Examples 1-12. In this example, the apparatus includes a temperature sensor, a pressure sensor, or an accelerometer, or any combinations thereof.

Example 14 incorporates the subject matter of any combination of Examples 1-13. In this example, the apparatus includes an audible alerting device, a visible alerting device, or both.

Example 15 incorporates the subject matter of any combination of Examples 1-14. In this example, the IoT device is hermetically sealed.

Example 16 incorporates the subject matter of any combination of Examples 1-15. In this example, the apparatus includes a battery, wherein the battery is built into the IoT device.

Example 17 incorporates the subject matter of any combination of Examples 1-16. In this example, the apparatus includes a display device on the IoT device.

Example 18 incorporates the subject matter of any combination of Examples 1-17. In this example, the apparatus includes a visible beacon, an auditory alarm, or both.

Example 19 incorporates the subject matter of any combination of Examples 1-18. In this example, the apparatus includes a radio communications device.

Example 20 incorporates the subject matter of any combination of Examples 1-19. In this example, the apparatus includes a radio communications device that includes a WiFi device, a Bluetooth device, a low energy Bluetooth device, a radio network device, or any combinations thereof.

Example 21 includes a method for monitoring assets, including communicating with an Internet of Things (IoT) device attached to an asset from an IoT gateway; and alerting a centralized information system when an actionable issue is detected.

Example 22 incorporates the subject matter of Example 21. In this example, the method includes determining that the IoT device has lost contact with the IoT gateway; and alerting the centralized information system that contact has been lost.

Example 23 incorporates the subject matter of any combination of Examples 21-22. In this example, the method includes receiving a notification from the IoT device that a sensor reading has exceeded a preset limit; and alerting the centralized information system.

Example 24 incorporates the subject matter of any combination of Examples 21-23. In this example, the method includes establishing an ad hoc network between a plurality of IoT devices.

Example 25 incorporates the subject matter of any combination of Examples 21-24. In this example, the method determining a location for each of the plurality of IoT devices by mapping a number of hops for each message in the ad hoc network to reach each of the plurality of the IoT devices from the IoT gateway.

Example 26 incorporates the subject matter of any combination of Examples 21-25. In this example, the method includes measuring pressure on a package with a pressure sensor.

Example 27 includes a non-transitory, machine readable medium, including instructions to direct a processor to communicate with an Internet of Things (IoT) device; and alert a centralized information system if contact to the IoT device is lost.

Example 28 incorporates the subject matter of Example 27. In this example, the non-transitory, machine readable medium includes instructions to direct a processor to receive an alert on a sensor reading from an IoT device; and report the alert to the centralized information system.

Example 29 incorporates the subject matter of any combination of Examples 27-28. In this example, the non-transitory, machine readable medium includes instructions to direct the processor to establish an ad hoc network between a plurality of IoT devices.

Example 30 incorporates the subject matter of any combination of Examples 27-29. In this example, the non-transitory, machine readable medium includes instructions to direct the processor to alert the centralized information system if a shipment is rerouted.

Example 31

According to this example there is provided a system for managing the security and custody of assets in storage or transit, including: an internet of things (IoT gateway) including a processor, memory, and communications circuitry, the IoT gateway configured to: allocate a plurality of assets to an asset group; receive sensor data from one or more sensors associated with each of the assets in the asset group, the sensor data including information concerning status factors affecting a respective one of the assets in the asset group; and analyze the sensor data provided by each of the sensors associated with asset in the asset group over a common time period to determine whether or not a security threat is present with regard to any one of the plurality of assets or to the asset group; wherein the analyzing includes at least comparing sensor data from each of the sensors to sensor data provided by each other of the sensors over the common time period.

Example 32

This example includes any or all of the features of example 31, wherein the status factors are selected from the group consisting of location of one of the assets in the asset group, ambient temperature, temperature of one of the assets in the asset group, acceleration experienced by an asset in the asset group, identification of one of the assets in the asset group, force experienced by an asset in the asset group, and combinations thereof.

Example 33

This example includes any or all of the features of example 32, wherein the IoT gateway is further configured to issue an alert when its analysis of the sensor data indicates that at least one of the status factors experienced by one of the assets in the asset group during a common time period differs from a corresponding status factor reported in sensor data provided by another of the sensors during the common time period.

Example 34

This example includes any or all of the features of example 31, wherein the sensors comprise an accelerometer and the sensor data includes accelerometer data.

Example 35

This example includes any or all of the features of example 34, wherein the accelerometer data describes acceleration experienced by an asset over the common period of time and an acceleration vector associated with the acceleration.

Example 36

This example includes any or all of the features of example 35, wherein the analyzing includes comparing the acceleration and acceleration vector experienced by a respective one of the assets during the common time period to the acceleration and acceleration vector experienced by other assets during the common time period.

Example 37

This example includes any or all of the features of example 36, wherein the IoT gateway is further configured to issue an alert when the analyzing reveals that at least one of the acceleration and acceleration vector experienced by one of the assets in the asset group during the common time period differs from at least one of the acceleration and acceleration vector of another of the assets in the asset group during the common time period.

Example 38

This example includes any or all of the features of example 37, wherein the alert is configured to indicate that one or more of the assets or the asset group has been stolen, left behind, is unsecured, is no longer on a transport vehicle, or that an item has been inserted into the asset group.

Example 39

This example includes any or all of the features of example 31, wherein the IoT gateway is configured to take or release custody over each sensor associated with one or more assets in the asset group.

Example 40

This example includes any or all of the features of example 39, wherein the IoT is a shipping gateway and is configured, in response to receipt of a custody transfer request from a receiving gateway, to transfer custody of one or more sensors associated with one or more assets in the asset group to the receiving gateway.

Example 41

This example includes any or all of the features of example 40, wherein prior to transferring custody of the one or more sensors, the shipping gateway is configured to verify the authenticity of the custody transfer request.

Example 42

This example includes any or all of the features of example 41, wherein after transferring custody of the one or more sensors, the shipping gateway is configured to verify physical transfer of a corresponding one of the assets to the receiving gateway.

Example 43

This example includes any or all of the features of example 42, wherein after verifying physical transfer of the corresponding one of the assets to the receiving gateway, the shipping gateway is to disassociate from the one or more sensors for whom custody was transferred.

Example 44

According to this example there is provided a method for managing the security and custody of assets in storage or transit, including: allocating a plurality of assets to an asset group, each of the assets being associated with one or more sensors, each of the sensors being configured to monitor status factors affecting a corresponding one of the plurality of assets and to produce sensor data; and analyzing sensor data provided by each of the sensors associated with assets in the asset group over a common time period to determine whether or not a security threat is present with regard to any one of the plurality of assets or to the asset group; wherein the analyzing includes at least comparing sensor data from each of the sensors to sensor data provided by each other of the sensors over the common time period.

Example 45

This example includes any or all of the features of example 44, wherein the status factors are selected from the group consisting of location of one of the assets in the asset group, ambient temperature, temperature of one of the assets in the asset group, acceleration experienced by an asset in the asset group, identification of one of the assets in the asset group, force experienced by an asset in the asset group, and combinations thereof.

Example 46

This example includes any or all of the features of example 44, further including issuing an alert when the analyzing indicates that at least one of the status factors experienced by one of the assets in the asset group during a common time period differs from a corresponding status factor reported in sensor data provided by another of the sensors during the common time period.

Example 47

This example includes any or all of the features of example 44, wherein the sensors comprise an accelerometer and the sensor data includes accelerometer data.

Example 48

This example includes any or all of the features of example 47, wherein the accelerometer data describes acceleration experienced by an asset over the common period of time and an acceleration vector associated with the acceleration.

Example 49

This example includes any or all of the features of example 48, wherein the analyzing includes comparing the acceleration and acceleration vector experienced by a respective one of the assets during the common time period to the acceleration and acceleration vector experienced by other assets during the common time period.

Example 50

This example includes any or all of the features of example 49, and further includes issuing an alert when the analyzing reveals that at least one of the acceleration and acceleration vector experienced by one of the assets in the asset group during the common time period differs from at least one of the acceleration and acceleration vector of another of the assets in the asset group during the common time period.

Example 51

This example includes any or all of the features of example 50, wherein the alert is configured to indicate that one or more of the assets or the asset group has been stolen, left behind, is unsecured, is no longer on a transport vehicle, or that an item has been inserted into the asset group.

Example 52

This example includes any or all of the features of example 44, and further includes taking custody of each sensor associated with one or more assets in the asset group.

Example 53

This example includes any or all of the features of example 52 and further includes, in response to receipt of a custody transfer request from a receiving gateway, transferring custody of one or more sensors associated with one or more assets in the asset group to the receiving gateway.

Example 54

This example includes any or all of the features of example 53 and further includes verifying the authenticity of the custody transfer request prior to transferring custody of the one or more sensors to the receiving gateway.

Example 55

This example includes any or all of the features of example 54 and further includes verifying, after transferring custody of the one or more sensors, physical transfer of a corresponding one of the assets to the receiving gateway.

Example 56

This example includes any or all of the features of example 55 and further includes, after verifying physical transfer of the corresponding one of the assets to the receiving gateway, disassociating from the one or more sensors for whom custody was transferred.

Example 57

According to this example there is provided a computer readable storage medium including instructions which when executed by one or more processors result in performance of the following operations including: allocating a plurality of assets to an asset group, each of the assets being associated with one or more sensors, each of the sensors being configured to monitor status factors affecting a corresponding one of the plurality of assets and to produce sensor data; and analyzing sensor data provided by each of the sensors associated with assets in the asset group over a common time period to determine whether or not a security threat is present with regard to any one of the plurality of assets or to the asset group; wherein the analyzing includes at least comparing sensor data from each of the sensors to sensor data provided by each other of the sensors over the common time period.

Example 58

This example includes any or all of the features of example 57, wherein the status factors are selected from the group consisting of location of one of the assets in the asset group, ambient temperature, temperature of one of the assets in the asset group, acceleration experienced by an asset in the asset group, identification of one of the assets in the asset group, force experienced by an asset in the asset group, and combinations thereof.

Example 59

This example includes any or all of the features of example 58, wherein the instructions when executed by the one or more processors further result in performance of the following operations including: issuing an alert when the analyzing indicates that at least one of the status factors experienced by one of the assets in the asset group during a common time period differs from a corresponding status factor reported in sensor data provided by another of the sensors during the common time period.

Example 60

This example includes any or all of the features of example 59, wherein the sensors comprise an accelerometer and the sensor data includes accelerometer data.

Example 61

This example includes any or all of the features of example 59, wherein the accelerometer data describes acceleration experienced by an asset over the common period of time and an acceleration vector associated with the acceleration.

Example 62

This example includes any or all of the features of example 60, wherein the analyzing includes comparing the acceleration and acceleration vector experienced by a respective one of the assets during the common time period to the acceleration and acceleration vector experienced by other assets during the common time period.

Example 63

This example includes any or all of the features of example 62, wherein the instructions when executed by the one or more processors further result in performance of the following operations including: issuing an alert when the analyzing reveals that at least one of the acceleration and acceleration vector experienced by one of the assets in the asset group during the common time period differs from at least one of the acceleration and acceleration vector of another of the assets in the asset group during the common time period.

Example 64

This example includes any or all of the features of example 63, wherein the alert is configured to indicate that one or more of the assets or the asset group has been stolen, left behind, is unsecured, is no longer on a transport vehicle, or that an item has been inserted into the asset group.

Example 65

This example includes any or all of the features of example 57, wherein the instructions when executed by the one or more processors further result in performance of the following operations including: taking custody of each sensor associated with one or more assets in the asset group.

Example 66

This example includes any or all of the features of example 65, wherein the instructions when executed by the one or more processors further result in performance of the following operations including: in response to receipt of a custody transfer request from a receiving gateway, transferring custody of one or more sensors associated with one or more assets in the asset group to the receiving gateway.

Example 67

This example includes any or all of the features of example 66, wherein the instructions when executed by the one or more processors further result in performance of the following operations including: verifying the authenticity of the custody transfer request prior to transferring custody of the one or more sensors to the receiving gateway.

Example 68

This example includes any or all of the features of example 67, wherein the instructions when executed by the one or more processors further result in performance of the following operations including: verifying, after transferring custody of the one or more sensors, physical transfer of a corresponding one of the assets to the receiving gateway.

Example 69

This example includes any or all of the features of example 68, wherein the instructions when executed by the one or more processors further result in performance of the following operations including: after verifying physical transfer of the corresponding one of the assets to the receiving gateway, disassociating from the one or more sensors for whom custody was transferred.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system for managing the security and custody of assets in storage or transit, comprising:
an internet of things (IoT) gateway comprising processing circuitry, memory, and communications circuitry, the IoT gateway configured to:
allocate, by the processing circuitry, a plurality of assets to an asset group;
receive, via the communication circuitry, acceleration sensor data from one or more sensors associated with each of the assets in said asset group, said acceleration sensor data comprising information concerning status factors affecting a respective one of said assets in said asset group;
determine, by the processing circuitry and based at least on the acceleration sensor data provided by each of said sensors associated with the plurality of assets allocated to said asset group over a common time period, whether a security threat is present with regard to any one of said plurality of assets or to said asset group, wherein to determine that a security threat is present includes to identify anomalous acceleration sensor data for one or more of said assets of the asset group relative to acceleration sensor data for multiple other of said assets of the asset group over said common time period, wherein it is determined that the security threat is present when the acceleration sensor data for the one or more of the assets of the asset group and the acceleration sensor data for the multiple other of the assets of the asset group indicate that the one or more of the assets of the asset group do not experience acceleration along a vector path that is parallel with one or more vector path of acceleration that is experienced by one or more of the multiple other of the assets of the asset group over the common time period;
adjust a priority of one or more shipments based on the indication that the one or more of the assets of the asset group do not experience the acceleration along the vector path that is parallel with the one or more vector path of acceleration experienced by one or more of the multiple other of the assets of the asset group over the common time period; and
initiate, via the processing circuitry and responsive to a determination that a security threat is present, at least one type of alert notification regarding the security threat.

2. The system of claim 1, wherein said sensors comprise an accelerometer and said acceleration sensor data comprises accelerometer data.

3. The system of claim 2, wherein the accelerometer data describes acceleration experienced by an asset over said common period of time and an acceleration vector associated with said acceleration.

4. The system of claim 3, wherein to identify the anomalous acceleration sensor data includes to identify that each of the one or more of said assets experienced acceleration along different vector paths during said common time period.

5. The system of claim 3, wherein to identify the anomalous acceleration sensor data includes to determine that at least one of the acceleration and acceleration vector experienced by the one or more of said assets during said common time period differs from the acceleration and/or acceleration vectors experienced by the multiple other of said assets during said common time period.

6. The system of claim 1, wherein said IoT gateway is configured to take or release custody over each sensor associated with one or more assets in said asset group.

7. The system of claim 6, wherein said IoT gateway is a shipping gateway and is configured, in response to receipt of a custody transfer request from a receiving gateway, to transfer custody of one or more sensors associated with one or more assets in said asset group to said receiving gateway.

8. The system of claim 7, wherein prior to transferring custody of said one or more sensors, said shipping gateway is configured to verify the authenticity of said custody transfer request.

9. The system of claim 1, wherein to determine that the security threat is present includes to identify anomalous acceleration sensor data for one or more of said assets of the asset group relative to acceleration sensor data for multiple other of said assets of the asset group over said common time period in view of contextual data associated with the plurality of assets.

10. The system of claim 1, wherein the status factors include one or more factors concerning a location of the asset, factors concerning a condition of the asset, and/or factors concerning a security of the asset.

11. The system of claim 10, wherein the factors concerning the condition of the asset include one or more of acceleration forces of the asset, shock force to the asset, operational status, humidity, and/or temperature.

12. The system of claim 1, the IoT gateway to adjust a priority of one or more shipment depending on the arrival of the one or more assets of the asset group that do not experience the acceleration along the vector path that is parallel with the one or more vector path of acceleration experienced by one or more of the multiple other assets of the asset group over the common time period.

13. A method for managing the security and custody of assets in storage or transit, comprising:
    allocating, via processing circuitry, a plurality of assets to an asset group, each of said assets being associated with one or more sensors, each of said sensors being configured to monitor status factors affecting a corresponding one of said plurality of assets and to produce acceleration sensor data;
    determining, via the processing circuitry and based at least on acceleration sensor data provided by each of the sensors associated with the plurality of assets allocated to said asset group over a common time period, whether a security threat is present with regard to any one of said plurality of assets or to said asset group, wherein determining that a security threat is present includes identifying anomalous acceleration sensor data for one or more of said assets of the asset group relative to acceleration sensor data for multiple other of said assets of the asset group over said common time period, wherein it is determined that the security threat is present when the acceleration sensor data for the one or more of the assets of the asset group and the acceleration sensor data for the multiple other of the assets of the asset group indicate that the one or more of the assets of the asset group do not experience acceleration along a vector path that is parallel with one or more vector path of acceleration that is experienced by one or more of the multiple other of the assets of the asset group over the common time period;
    adjusting a priority of one or more shipments based on the indication that the one or more of the assets of the asset group do not experience the acceleration along the vector path that is parallel with the one or more vector path of acceleration experienced by one or more of the multiple other assets of the asset group over the common time period; and
    initiating, via the processing circuitry and responsive to determining that a security threat is present, at least one type of alert notification regarding the security threat.

14. The method of claim 13, wherein said sensors comprise an accelerometer and said acceleration sensor data comprises accelerometer data.

15. The method of claim 14, wherein the accelerometer data describes acceleration experienced by an asset over said common period of time and an acceleration vector associated with said acceleration.

16. The method of claim 15, wherein identifying the anomalous acceleration sensor data includes identifying that each of the one or more of said assets experienced acceleration along different vector paths during said common time period.

17. The method of claim 15, wherein identifying the anomalous acceleration sensor data includes determining that at least one of the acceleration and acceleration vector experienced by the one or more of said assets during said common time period differs from the acceleration and/or acceleration vectors experienced by the multiple other of said assets during said common time period.

18. The method of claim 13, further comprising taking custody of each sensor associated with one or more assets in said asset group.

19. The method of claim 18, further comprising, in response to receipt of a custody transfer request from a receiving gateway, transferring custody of one or more sensors associated with one or more assets in said asset group to said receiving gateway.

20. The method of claim 19, further comprising verifying the authenticity of said custody transfer request prior to transferring custody of said one or more sensors to said receiving gateway.

21. The method of claim 13, comprising determining that the security threat is present, including identifying anomalous acceleration sensor data for one or more of said assets of the asset group relative to acceleration sensor data for multiple other of said assets of the asset group over said common time period in view of contextual data associated with the plurality of assets.

22. The method of claim 13, wherein the status factors include one or more factors concerning a location of the asset, factors concerning a condition of the asset, and/or factors concerning a security of the asset.

23. The method of claim 22, wherein the factors concerning the condition of the asset include one or more of acceleration forces of the asset, shock force to the asset, operational status, humidity, and/or temperature.

24. The method of claim 13, comprising adjusting a priority of one or more shipment depending on the arrival of the one or more assets of the asset group that do not experience the acceleration along the vector path that is parallel with the one or more vector path of acceleration experienced by one or more of the multiple other assets of the asset group over the common time period.

25. A non-transitory computer readable storage medium comprising instructions which when executed by one or more processors result in performance of the following operations comprising:
    allocating a plurality of assets to an asset group, each of said assets being associated with one or more sensors, each of said sensors being configured to monitor status factors affecting a corresponding one of said plurality of assets and to produce sensor data;
    determining, based at least on acceleration sensor data provided by each of the sensors associated with the plurality of assets allocated to said asset group over a common time period, whether a security threat is present with regard to any one of said plurality of assets or to said asset group, wherein determining that a security threat is present includes identifying anomalous acceleration sensor data for one or more of said assets of the asset group relative to sensor data for multiple other of said assets of the asset group over said common time period, wherein it is determined that the security threat is present when the acceleration sensor data for the one or more of the assets of the asset group and the acceleration sensor data for the multiple other of the assets of the asset group indicate that the one or more of the assets of the asset group do not experience acceleration along a vector path that is parallel with one or more vector path of acceleration that is experienced by one or more of the multiple other of the assets of the asset group over the common time period;

adjusting a priority of one or more shipments based on the indication that the one or more of the assets of the asset group do not experience the acceleration along the vector path that is parallel with the one or more vector path of acceleration experienced by one or more of the multiple other assets of the asset group over the common time period; and initiating, responsive to determining that a security threat is present, at least one type of alert notification regarding the security threat.

26. The non-transitory computer readable storage medium of claim 25, wherein said sensors comprise an accelerometer and said acceleration sensor data comprises accelerometer data.

27. The non-transitory computer readable storage medium of claim 26, wherein the accelerometer data describes acceleration experienced by an asset over said common period of time and an acceleration vector associated with said acceleration.

28. The non-transitory computer readable storage medium of claim 27, wherein identifying the anomalous acceleration sensor data includes identifying that each of the one or more of said assets experienced acceleration along different vector paths during said common time period.

29. The non-transitory computer readable storage medium of claim 27, wherein identifying the anomalous acceleration sensor data includes:

determining that at least one of the acceleration and acceleration vector experienced by the one or more of said assets during said common time period differs from the acceleration and/or acceleration vectors experienced by the multiple other of said assets during said common time period.

30. The non-transitory computer readable storage medium of claim 25, wherein said instructions when executed by said one or more processors further result in performance of the following operations comprising:

taking custody of each sensor associated with one or more assets in said asset group.

31. The non-transitory computer readable storage medium of claim 30, wherein said instructions when executed by said one or more processors further result in performance of the following operations comprising:

in response to receipt of a custody transfer request from a receiving gateway, transferring custody of one or more sensors associated with one or more assets in said asset group to said receiving gateway.

32. The non-transitory computer readable storage medium of claim 31, wherein said instructions when executed by said one or more processors further result in performance of the following operations comprising:

verifying the authenticity of said custody transfer request prior to transferring custody of said one or more sensors to said receiving gateway.

33. The non-transitory computer readable storage medium of claim 32, wherein said instructions when executed by said one or more processors further result in performance of the following operations comprising:

verifying, after transferring custody of said one or more sensors, physical transfer of a corresponding one of said assets to said receiving gateway.

34. The non-transitory computer readable storage medium of claim 25, wherein said instructions when executed by said one or more processors further result in performance of the following operations comprising:

determining that the security threat is present, including identifying anomalous acceleration sensor data for one or more of said assets of the asset group relative to acceleration sensor data for multiple other of said assets of the asset group over said common time period in view of contextual data associated with the plurality of assets.

35. The non-transitory computer readable storage medium of claim 25, wherein the status factors include one or more factors concerning a location of the asset, factors concerning a condition of the asset, and/or factors concerning a security of the asset.

36. The non-transitory computer readable storage medium of claim 35, wherein the factors concerning the condition of the asset include one or more of acceleration forces of the asset, shock force to the asset, operational status, humidity, and/or temperature.

37. The non-transitory computer readable storage medium of claim 25, wherein said instructions when executed by said one or more processors further result in performance of the following operations comprising adjusting a priority of one or more shipment depending on the arrival of the one or more assets of the asset group that do not experience the acceleration along the vector path that is parallel with the one or more vector path of acceleration experienced by one or more of the multiple other assets of the asset group over the common time period.

* * * * *

UNITED STATES PATENT AND TRADEMARK OFFICE
CERTIFICATE OF CORRECTION

PATENT NO. : 11,062,255 B2  
APPLICATION NO. : 15/190443  
DATED : July 13, 2021  
INVENTOR(S) : George P. Moakley Page 1 of 1

It is certified that error appears in the above-identified patent and that said Letters Patent is hereby corrected as shown below:

In the Claims

In Column 41, Line 61, in Claim 1, delete "(loT)" and insert --(IoT)-- therefor

In Column 41, Line 63, in Claim 1, delete "loT" and insert --IoT-- therefor

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*